United States Patent
Chavan

(10) Patent No.: US 9,052,792 B2
(45) Date of Patent: Jun. 9, 2015

(54) INSERTING A SEARCH BOX INTO A MOBILE TERMINAL DIALOG MESSAGING PROTOCOL

(75) Inventor: Viraj Sudhir Chavan, Sunnyvale, CA (US)

(73) Assignee: YAHOO! INC., Sunnyvale, CA (US)

( * ) Notice: Subject to any disclaimer, the term of this patent is extended or adjusted under 35 U.S.C. 154(b) by 101 days.

(21) Appl. No.: 13/467,797

(22) Filed: May 9, 2012

(65) Prior Publication Data
US 2013/0159074 A1 Jun. 20, 2013

Related U.S. Application Data

(63) Continuation-in-part of application No. 13/458,686, filed on Apr. 27, 2012, and a continuation-in-part of application No. 13/331,262, filed on Dec. 20, 2011.

(51) Int. Cl.
| | |
|---|---|
| *G06F 3/0481* | (2013.01) |
| *G06F 3/048* | (2013.01) |
| *G06F 3/00* | (2006.01) |
| *G06F 3/05* | (2006.01) |

(52) U.S. Cl.
CPC . *G06F 3/048* (2013.01); *G06F 3/00* (2013.01); *G06F 3/05* (2013.01); *G06F 3/0481* (2013.01)

(58) Field of Classification Search
CPC .......................... G06F 3/00–3/05; G06F 3/048
USPC ................. 715/737, 751, 752, 753, 864, 964
See application file for complete search history.

(56) References Cited

U.S. PATENT DOCUMENTS

| | | | |
|---|---|---|---|
| 2004/0078394 A1 | 4/2004 | Powell et al. | |
| 2007/0088687 A1* | 4/2007 | Bromm et al. | 707/4 |
| 2008/0215692 A1* | 9/2008 | Bosarge et al. | 709/206 |
| 2010/0049812 A1* | 2/2010 | Brown et al. | 709/206 |
| 2010/0100839 A1* | 4/2010 | Tseng et al. | 715/780 |
| 2011/0254792 A1* | 10/2011 | Waters et al. | 345/173 |

OTHER PUBLICATIONS

U.S. Appl. No. 13/331,262, titled "Systems and Methods for Generating Revenue Based on Custom Click to Call Advertisements".
U.S. Appl. No. 13/458,686, titled "Systems and Methods for Insertion of Content into an Email over IMAP".
U.S. Appl. No. 13/490,288, titled "Server-Side Modification of Messages during a Mobile Terminal Message Exchange".

* cited by examiner

*Primary Examiner* — Nicholas Ulrich
*Assistant Examiner* — Shangao Zhang
(74) *Attorney, Agent, or Firm* — James J. DeCarlo; Greenberg Traurig, LLP

(57) ABSTRACT

A method, system, and computer program product for inserting a search box into a mobile terminal messaging dialog. Upon receiving a dialog message (e.g., an email message) from a first user device, the method determines the format (e.g., IMAP) of the dialog message in order to insert a similarly-formatted search box. Then, the method modifies the dialog message by inserting the selected search box into the dialog message. The method receives a request from a second user (at a mobile terminal) and the method transmits the outbound dialog message with the inserted search box to the second user's mobile terminal. The second user's mobile terminal supports a web browser, and some dialog messages include pre-populated text in the search box, the pre-populated text based on the dialog message from the first user device. The second user browses using the inserted search box without having to explicitly launch a browser.

20 Claims, 12 Drawing Sheets

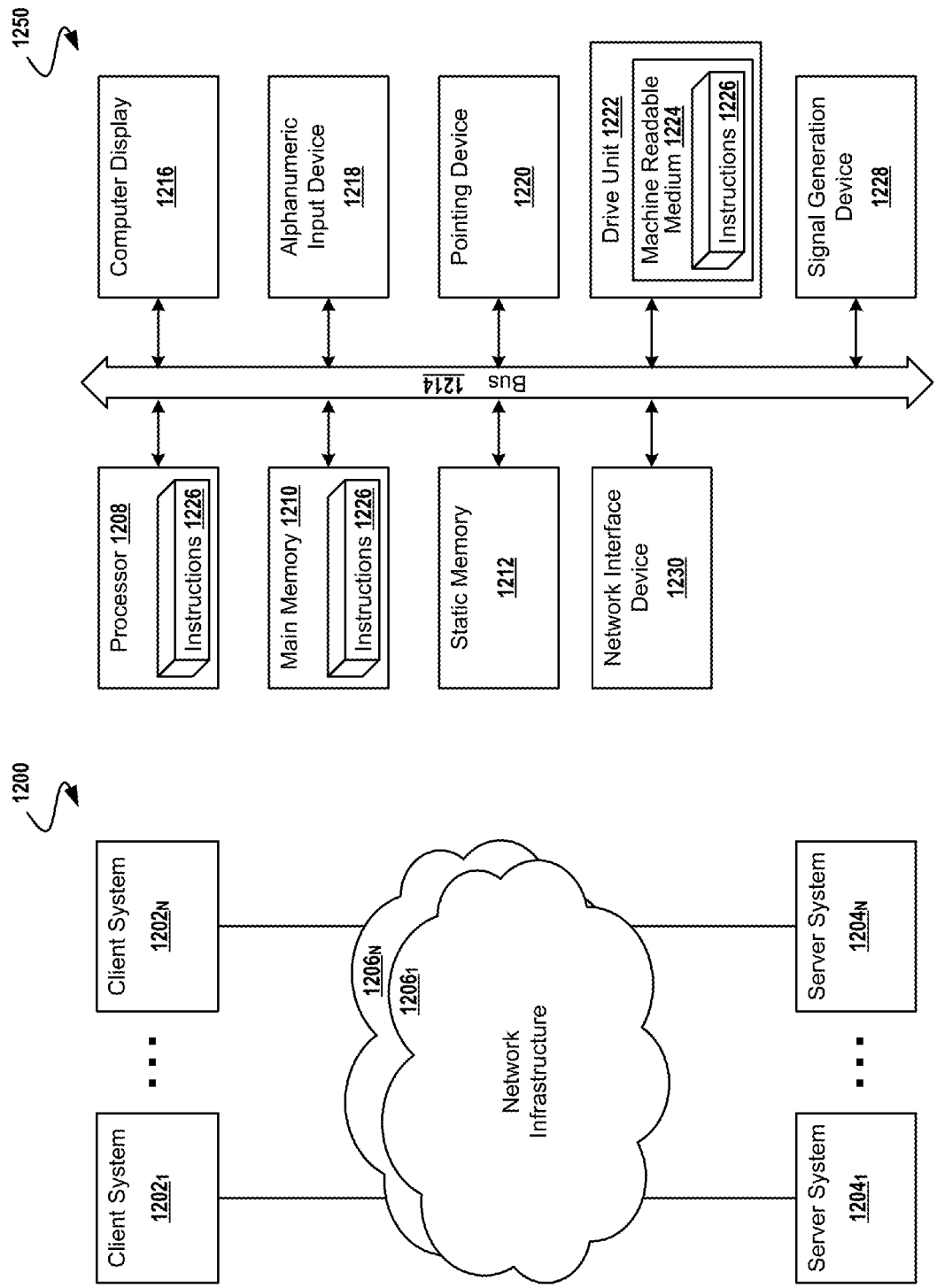

INSERTING A SEARCH BOX INTO A MOBILE TERMINAL DIALOG MESSAGING PROTOCOL

The present application claims the benefit of priority to co-pending U.S. patent application Ser. No. 13/458,686, entitled "SYSTEMS AND METHODS FOR INSERTION OF CONTENT INTO AN EMAIL OVER IMAP"; and the present application claims the benefit of priority to co-pending U.S. patent application Ser. No. 13/331,262, entitled "SYSTEMS AND METHODS FOR GENERATING REVENUE BASED ON CUSTOM CLICK TO CALL ADVERTISEMENTS", both of which are hereby incorporated by reference in entirety.

FIELD

The present disclosure is directed towards internet messaging using mobile terminals, and more particularly towards techniques for inserting a search box into a mobile terminal messaging dialog.

BACKGROUND

Each day, hundreds of millions of internet messages are sent between mobile devices (e.g., smartphones, mobile terminals, etc.) by users of the internet. Thus, there exists an opportunity for a search engine provider or agent to engage with the users of these mobile devices. For example, if a search engine provider or agent could engage the users by providing a search box embedded in the message, then the search engine provider could solicit hundreds of millions of new search page views each day. Yet, legacy standards and legacy implementations of mobile-to-mobile messaging does not support searching from within the message itself. Instead, a user is encumbered with having to switch applications (e.g., to a browser) and type in the search parameters, and etcetera.

What is needed are a techniques to embed a search box inside a message, and deliver the message over the internet to the user's mobile device, who in turn can see the search box when viewing the message using a native messaging client (e.g., email client, SMS client, etc.).

The legacy implementations provide native email and SMS clients on various mobile terminals (e.g., Android phones, iPhones, etc.), yet such legacy implementations offer only legacy experiences to users. To improve the user experience, techniques for inserting a search box into a mobile terminal message is needed.

Other features and advantages will be apparent from the accompanying drawings, and from the detailed description that follows below.

SUMMARY

Disclosed herein are a method, system, and computer program product for inserting a search box into a mobile terminal messaging dialog. Upon receiving a dialog message (e.g., an email message) from a first user device, the method determines the format (e.g., IMAP) of the dialog message in order to insert a similarly-formatted search box. Then, the method modifies the dialog message by inserting the selected search box into the dialog message. The method receives a request from a second user (at a mobile terminal) and the method transmits the outbound dialog message with the inserted search box to the second user's mobile terminal. The second user's mobile terminal supports a web browser, and some dialog messages include pre-populated text in the search box, the pre-populated text based on the dialog message from the first user device. The second user can browse using the inserted search box without having to explicitly launch a browser.

BRIEF DESCRIPTION OF THE DRAWINGS

Specific embodiments and features are set forth in the appended claims. However, for purpose of explanation, several exemplary embodiments are set forth in the following figures. Like reference characters refer to corresponding parts throughout the drawings.

FIG. 12 is a block diagram of a computer system for implementing embodiments.

DETAILED DESCRIPTION

Figure 1:
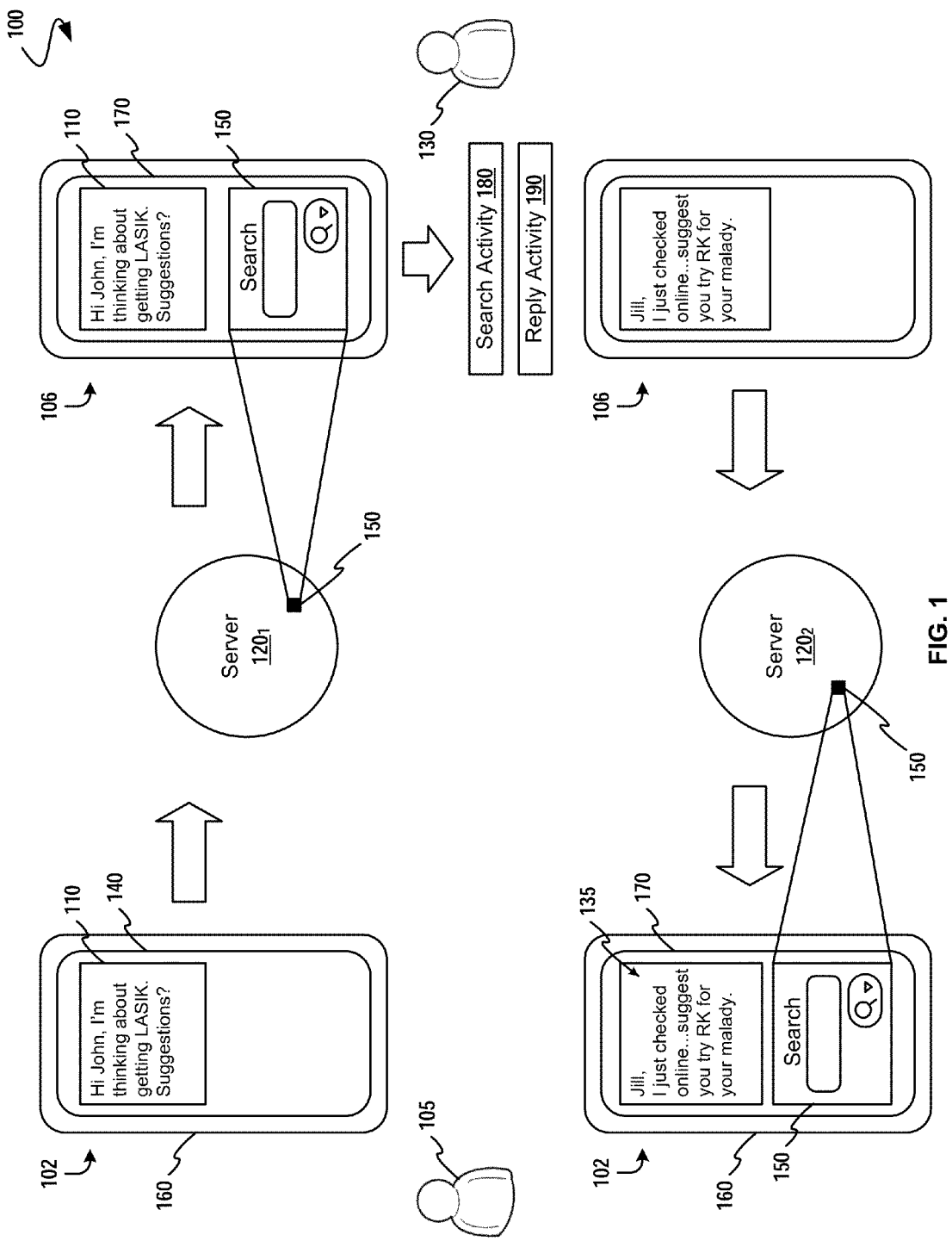
FIG. 1 is a data flow diagram of a system for inserting a search box into a mobile terminal messaging dialog, according to some embodiments.

Reference will now be made to various embodiments, some examples of which are illustrated in the accompanying drawings.

Overview

Techniques for inserting a search box into a mobile terminal dialog messaging protocol are provided herein. Implementations allow the user to search the web directly from his/her messaging client (e.g., email client, SMS client, etc.). Following the techniques disclosed herein, users of any native client (e.g., email client, SMS client, etc.) that operates on any mobile device can search the web directly from his/her messaging client by using an inserted search box.

In exemplary operation, a receiving user receives a message from a sending user as a part of message dialog involving at least one mobile terminal. Once the receiving user reviews the content sent by the sending user, the receiving user might notice the search box embedded in the message, and might interact with the search box to perform search activities (e.g., querying, reviewing search results, etc.). For example, user "Bob" might send a message to Alice, which message Alice receives on her mobile terminal. The message might read: "Alice: Let's find out what are the best restaurants in Paris—Luv, Bob". Alice might read Bob's message and notice the search box embedded in the message. Alice can easily initiate a web search for "Paris restaurants" directly from the embedded search box that was inserted into Bob's message.

Of course, the foregoing is but one exemplary use case, and additional use cases, additional features, and implementation techniques are presented herein. For instance, in some embodiments, when a user does decide to interact with the search box, embedded code (e.g., HTML) that was inserted with the text box might prompt the user to select a default search provider. In such a case, HTML that was inserted with the text box might prompt the user to select a default search provider, for instance Yahoo! This example is further described in the context of FIG. 5. Also, in some embodiments, the search box can be pre-populated with specific content that can be determined and/or selected or otherwise driven by the occurrence of words or other characteristics found in a user's message. This example is further described in the context of FIG. 6.

Now, pertaining to mobile terminals (e.g., smartphones, iPads, etc.), many native third party email clients are delivered with or on the mobile terminal as a "stock" application to process messages for their users via a "fetch" of the message (e.g., email) over IMAP using an IMAP server. In other situations email or other messaging content is pushed from a server to the "stock" application. In some embodiments, a server performs operations for populating the search box with text at least partly based on the dialog message from a first user. In exemplary embodiments, an HTML-5 search box is inserted dynamically into the body of the message. In some cases, the search box is pre-populated with context-driven terms present in the user's current message (or possibly pre-populated with context-driven terms present found in previously-received message). That is, in this or other cases, the search box may be presented with context-driven content based on terms present in the user's message or thread. This supports an ecosystem where email or other messaging delivery can be highly personalized at the election of the user or authorized agents.

As can now be seen, the user can search directly from the message without having to leave the native email or messaging client in order to open a separate application (e.g., a browser). Thus the user experience is greatly enhanced, firstly by having the convenience of the presence of the search box in the content (and ease of initiating search activities), and secondly by virtue of the context and relevance of a pre-populated search box. For example, and returning to the earlier discussed message thread, if the body of an email includes text in the form of, "Alice: Let's find good restaurants in Paris—Luv, Bob", the user (e.g., Alice) can directly initiate a web search for "Paris restaurants" without leaving the messaging client in order to explicitly launch the browser.

Reference will now be made in further detail to various embodiments, some examples of which are illustrated in the accompanying drawings. It will be understood that the described embodiments are not intended to limit the scope of the claims. On the contrary, the embodiments are intended to cover alternatives, modifications and equivalents, which may be included within the scope of the appended claims. Furthermore, in the following detailed descriptions, numerous specific details are set forth in order to provide a thorough understanding of the exemplary embodiments. However, one of ordinary skill in the art can recognize that the present advances may be practiced without these specific details. In other instances, well known methods, procedures, components, and circuits have not been described in detail so as avoid unnecessarily obscuring aspects of the described embodiments.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood, at least in part, from usage in context. For example, terms such as "and", "or", or "and/or" as used herein may include a variety of meanings that may depend at least in part upon the context in which such terms are used. Typically, "or", if used to associate a list; (for example, a list such as A, B or C), is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the" may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, depending at least in part on context.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., as may be used herein is generally conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions using terms such as "processing" or "computing" or "communicating" or "instantiating" or "registering" or "selecting", or "displaying" or the like, refer to the action and processes of a computer system or similar electronic computing device that manipulates and transforms data represented as physical (electronic) quantities within the computer system's registers and memories into other data similarly represented as physical quantities within the computer system memories or registers or other such information storage, transmission or display devices.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Section I: General Terms

Some of the terms used in this description are defined below (in alphabetical order) for easy reference. These terms are not rigidly restricted to these definitions. A term may be further defined by the term's use in other sections of this description.

"Ad" (e.g., ad, item and/or message) means a paid announcement, as of goods or services for sale, preferably on a network such as the internet. An ad may also be referred to as an item and/or a message.

"Ad call" means a message sent by a computer to an ad server for requesting an ad to be displayed.

"Ad click-through rate" (e.g., click-through rate) means a measurement of ad clicks per a period of time.

"Ad code" means the HTML or other markup language description that describes an advertisement or message in such a manner as can be parsed by a browser. Ad code may include references to other ad code. Ad code may mean any subset or portion or segment of ad code that describes an advertisement or message in such a manner as can be parsed by a browser.

An "Ad server" comprises a server that stores online advertisements for presentation to users. "Ad serving" refers to methods used to place online advertisements on websites, in applications, or other places where users are more likely to see them such as during an online session or during computing platform use, for example. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

"Advertiser" (e.g., messenger and/or messaging customer, etc.) means an entity that is in the business of marketing a product and/or a service to users. An advertiser may include, without limitation, a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Ad targeting" or "targeting" refers to web portals like Yahoo!, where advertisements may be displayed on web pages resulting from a user-defined search based at least in part upon one or more search terms. Advertising may be beneficial to users, advertisers, or web portals if displayed advertisements are relevant to interests of one or more users. Thus, a variety of techniques have been developed to infer user interest, user intent, or to subsequently target relevant advertising to users. One approach to presenting targeted advertisements includes employing demographic characteristics (e.g., age, income, sex, occupation, etc.) for predicting user behavior, such as by a group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

"Application server" is a server that is configured for running one or more devices loaded onto the application server. For example, an application server may run a device configured for deducing shadow profiles.

"Click" (e.g., ad click) means a selection of an ad impression by using a selection device such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

A "Computing device" means a computing device that may be capable of sending or receiving signals such as via a wired or wireless network, or may be capable of processing or storing signals such as in memory as physical memory states, and may, therefore, operate as a server. Thus, devices capable of operating as a server may include, as examples, dedicated rack-mounted servers, desktop computers, laptop computers, set top boxes, integrated devices combining various features such as two or more features of the foregoing devices, or the like.

A "Content server" is a server that may include a device that includes a configuration to provide content via a network to another device. A content server may, for example, host a site such as a social networking site, examples of which may include, without limitation, Flicker, Twitter, Facebook, LinkedIn, or a personal user site (such as a blog, vlog, online dating site, etc.). A content server may also host a variety of other sites, including, but not limited to, business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals such as electrical signals, for example, or may be stored in memory as physical states, for example.

Examples of devices that may operate as a content server include desktop computers, multiprocessor systems, microprocessor-type or programmable consumer electronics, etc.

"Conversion" (e.g., ad conversion) means a purchase of a product/service that happens as a result of a user responding to an ad and/or a coupon.

A "Content delivery network" or "content distribution network" (CDN) refers to a distributed content delivery system that comprises a collection of computers or computing devices linked by a network or networks. A CDN may employ software, systems, protocols or techniques to facilitate various services such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure in whole or in part.

"Coupon" (e.g., coupon ad) means a portion of a certificate, ticket, label, ad or the like—set off from the main body by dotted lines or the like to emphasize its separability—entitling the holder to something such as a gift or discount, or for use as an order blank or a contest entry form, etc. A coupon is designed in a convenient format for a user to "take" the coupon to a seller to receive an advertised benefit.

"Database" (e.g., database system, etc.) means a collection of data organized in such a way that a computer program may quickly select desired pieces of the data. A database is an electronic filing system. In some instances, the term "database" is used as shorthand for a "database management system". A database may be implemented as any type of data storage structure capable of providing for the retrieval and storage of a variety of data types. For instance, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include, without limitation, a software application such as Microsoft Word™ or a database; or hardware such as a laptop computer, a server, a display; or a computer mouse and/or a hard disk.

"Impression" (e.g., ad impression) means a delivery of an ad to a user device for viewing by a user.

The "Internet" or "internet" refers to a decentralized global network of networks. The internet includes local area networks (LANs), wide area networks (WANs), wireless networks, or long haul public networks that, for example, allow signal packets to be communicated between LANs. Signal packets may be communicated between nodes of a network such as, for example, to one or more sites employing a local network address. A signal packet may, for example, be communicated over the internet from a user site via an access node coupled to the internet. Likewise, a signal packet may be forwarded via network nodes to a target site coupled to the network via a network access node, for example. A signal packet communicated via the internet may, for example, be routed via a path of gateways, servers, etc. that may route the signal packet in accordance with a target address and the availability of a network path to the target address.

"Item" means an ad, which is defined above.

"Marketplace" means a world of commercial activity where products and/or services are browsed, bought and/or sold, etc. A marketplace may be located over a network such as the internet. A marketplace may also be located in a physical environment such as a shopping mall.

"Message" means an ad, which is defined above.

"Messaging" means advertising, which is defined above.

"Messenger" means an advertiser, which is defined above.

"Monetization techniques" or "monetization models" refers to techniques used in connection with sponsored search advertising, including advertising associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example. A process of buying or selling online advertisements may involve a number of different entities including advertisers, publishers, agencies, networks, or developers. To simplify this process, organization systems called "ad exchanges" may associate advertisers or publishers, such as via a platform, to facilitate buying or selling of online advertisement inventory from multiple ad networks. "Ad networks" refers to an aggregation of ad space supply from publishers such as for provision en masse to advertisers.

"Network" means a connection, between any two or more computers, that permits the transmission of data. A network may be any combination of networks including, without limitation, the internet, a local area network, a wide area network, a wireless network, and/or a cellular network.

A "Network" means a network that may couple devices so that communications may be exchanged such as between a server and a client device or other types of devices, including between wireless devices coupled via a wireless network, for example. A network may also include mass storage such as network attached storage (NAS), a storage area network (SAN), or other forms of computer or machine readable media, for example. A network may include the internet, one or more local area networks (LANs), one or more wide area networks (WANs), wire-line type connections, wireless type connections, or any combination thereof. Likewise, sub-networks such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines such as a twisted wire pair, a coaxial cable, full or fractional digital lines including T1, T2, T3, or T4 type lines, integrated services digital networks (ISDNs), digital subscriber lines (DSLs), wireless links including satellite links, or other communication links or channels such as may be known to those skilled in the art. Furthermore, a computing device or other related electronic devices may be remotely coupled to a network such as via a telephone line or link, for example.

A wireless network may couple client devices with a network. A wireless network may employ stand-alone ad-hoc networks, mesh networks, wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including long term evolution (LTE), WLAN, wireless router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies such as global system for mobile communication (GSM), universal mobile telecommunications system (UMTS), general packet radio services (GPRS), enhanced data GSM environment (EDGE), 3GPP long term evolution (LTE), LTE advanced, wideband code division multiple access (WCDMA), Bluetooth, 802.11b/g/n, or the like. A wireless network may include virtually any type of wireless communication mechanism by which signals may be communicated between devices such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the internet protocol (IP) may include IPv4 or IPv6.

A "peer-to-peer network" or "P2P network" may employ computing power or bandwidth of network participants in contrast with a network that may employ dedicated devices such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

"Publisher" means an entity that publishes, on a network, a web page having content and/or ads, etc. ad/or publishes, on a network, a downloadable application and/or other digital context having digital content and/or digital ads, etc.

"Server" means a software application that provides services to other computer programs (and their users) on the same computer or on another computer or computers. A server may also refer to the physical computer that has been set aside to run a specific server application. For example, when the software Apache HTTP server is used as the web server for a company's website, the computer running Apache may also be called the web server. Server applications may be divided among server computers over an extreme range, depending upon the workload. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems such as Windows Server, Mac OS X, Unix, Linux, FreeBSD, or the like.

"Social network" or "social networking website" refers generally to a network of individuals such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be generated according to user profiles of individuals, for example, in which a subgroup member may belong to multiple subgroups. An individual may also have multiple "1:few" associations within a social network such as for family, college classmates, or co-workers.

An individual's social network may refer to a set of direct personal relationships or a set of indirect personal relationships. A direct personal relationship refers to a relationship for an individual in which communications may be individual-to-individual such as with family members, friends, colleagues, co-workers, or the like. An indirect personal relationship refers to a relationship that may be available to an individual with another individual although no form of individual-to-individual communication may have taken place such as a friend of a friend, or the like. Different privileges or permissions may be associated with relationships in a social network. A social network also may generate relationships or connections with entities other than a person such as companies, brands, or so-called 'virtual persons.' An individual's social network may be represented in a variety of forms such as visually, electronically or functionally. For example, a "social graph" or "socio-gram" may represent an entity in a social network as a node and may represent a relationship as an edge or a link.

Individuals within one or more social networks may interact or communicate with other members of a social network via a variety of devices. Multi-modal communication technologies refers to a set of technologies that permit interoperable communication across multiple devices or platforms such as cell phones, smartphones, tablet computing devices, personal computers, televisions, SMS/MMS, email, instant messenger clients, forums, social networking sites (such as Facebook, Twitter, Google+, etc.), or the like.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++, and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" means a device or multiple coupled devices. A device is defined above.

"User" (e.g., consumer, etc.) means an operator of a user device. A user is typically a person who seeks to acquire a product and/or service. For example, a user may be a person who is browsing Yahoo!™ Shopping for a new cell phone to replace their current cell phone. The term "user" may also refer to a user device, depending on the context.

"User device" (e.g., computer, user computer, client and/or server, etc.) means a single computer or a network of interacting computers. A user device is a computer that a user may use to communicate with other devices over a network such as the internet. A user device is a combination of a hardware system, a software operating system, and perhaps one or more software application programs. Examples of a user device include, without limitation, a laptop computer, a palmtop computer, a smartphone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

"Web browser" means a software program that may display text or graphics or both from web pages on websites. Examples of a web browser include, without limitation, Mozilla Firefox™ and Microsoft Internet Explorer™.

"Web page" means documents written in a mark-up language including, without limitation, HTML (hypertext mark-up language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (uniform resource locator).

"Web portal" (e.g., public portal) means a website or service that offers a broad array of resources and services such as, for example, email, forums, search engines, and online shopping malls. The first web portals were online services, such as AOL, that provided access to the web. However, now, most of the traditional search engines (e.g., Yahoo!™) have transformed themselves into web portals to attract and keep a larger audience.

"Web server" is a server configured for serving at least one web page to a web browser. An example of a web server is a Yahoo!™ web server. A server is defined above.

Section II: Descriptions of the Figures

FIG. 1 is a data flow diagram of a system for inserting a search box into a mobile terminal messaging dialog. As an option, the present environment 100 may be implemented in the context of the architecture and functionality of the embodiments described herein. Of course, however, the environment 100 or any operation therein may be carried out in any desired environment.

FIG. 1 is an example embodiment of an environment 100 for inserting a search box into a dialog message over an internet messaging protocol in accordance with some embodiments of the disclosure. As shown, the environment 100 comprises a server (e.g., an internet messaging protocol server $120_1$) that receives a dialog message from a sending user 105 via a first user device 102, modifies the dialog message by inserting a search box, and transmits the modified dialog message 170 to a second user's mobile terminal 106.

As seen in FIG. 1, the environment 100 may comprise multiple servers (e.g., internet messaging protocol server $120_1$, internet messaging protocol server $120_2$, etc.). In some embodiments, the server 120 may comprise a dialog message server in the form of an IMAP server or other internet messaging protocol server that receives one or more dialog messages from users and stores the dialog messages to be viewed and/or transmitted to other users. The server 120 may receive a dialog message 140 from a first user 105. In some embodiments, the first user 105 (e.g., a first sending user) may use a computer and/or a smartphone (e.g., a first user device). The first user 105 may compose a portion of a dialog message intended to be read by the second user 130. In some embodiments, a dialog message 140 from the first user 105 may be transmitted to the server 120 and the dialog message 140 may then be modified by the server to form a modified dialog message 170 (e.g., with inserted search box 150 and/or other content such as an advertisement), which may then be transmitted to the second user 130. In some embodiments, the second user 130 may comprise a smartphone running a native dialog message client application (e.g., an email client, an SMS client). The server 120 may insert an instance of an inserted search box 150 into the dialog message 140 as received from (e.g., composed by) the first user 105 and then transmit the dialog message with the aforementioned instance of an inserted search box 150 to the second user 130. In some cases (e.g., in response to a POP request) the second user may receive the dialog message with the aforementioned instance of an inserted search box 130 in response to a request from the second user device 106 to view unread messages.

As shown, the environment 100 comprises two servers, however the shown two servers can be implemented using a single physical server, or the servers can be separate physical servers. In an exemplary embodiment, a first server may insert a search box, possibly with additional content into a dialog message over an internet messaging protocol, and the additional content (e.g., an advertisement) can be inserted by a second server. In this and other embodiments, when the server is inserting the search box and/or additional content into a dialog message, the server(s) can carry out the insertion by way of an internet messaging protocol. Thus, content may be placed into dialog messages regardless of the type of device that users may use to send and/or receive dialog messages.

A dialog message composition screen 160 may comprise a dialog message written by a first user (e.g., a written dialog message 110). As used herein, a written dialog message 110 does not comprise a search box or an advertisement or other content inserted over an internet messaging protocol. However, as used herein a modified dialog message 170 can comprise the aforementioned search box and/or additional content.

More particularly, and as shown, in FIG. 1, the dialog message composition screen 160 may comprise a written dialog message 110, which written dialog message 110 comprises at least a portion of the dialog message 140. In some embodiments, the written dialog message may comprise identifiable subject matter (e.g., topics) that may be used to determine additional content (e.g., search box pre-population text, an advertisement, etc.) to insert into the dialog message over an internet messaging protocol.

The dialog message may be generated by inserting the search box as dynamic HTML tags into the protocol (e.g., an internet messaging protocol) of the dialog message 140. An exchange of messages can occur synchronously or asynchronously, and delivery can be via the techniques of "push" or "fetch". Following a fetch protocol, a user 130 (e.g., via a user device 106) may transmit a request to receive any dialog messages, and when any are available, they can be sent with the inserted content.

In some embodiments, the server 120 may insert content using a dynamic HTML format. For example, the content may be generated as dynamic HTML tags. The server 120 may insert the search box and corresponding content by inserting dynamic HTML tags into a dialog message protocol corresponding to the dialog message 140. For example, the dialog message 140 transmitted by the first user 105 may be stored on the server and may be transmitted to the second user 130 in accordance with a particular dialog message protocol. For example, when the second user 130 requests the dialog message 140 that is stored on the server 120, the dialog message with the inserted search box may be transmitted based on an internet message access protocol (IMAP), and any search box dynamic HTML tags may be inserted into an internet messaging protocol corresponding to the dialog message 140. In some embodiments, the dialog message with the search box may be received in a first internet messaging protocol and then transmitted based on another dialog message protocol such as post office protocol (POP). Similarly, the search box dynamic HTML tags may also be inserted into a dialog message corresponding to a first internet messaging protocol and transmitted using a second internet messaging protocol. Thus, the insertion of the search box may be considered to be independent of the type of user device, and independent of the internet messaging protocol, and independent of the native dialog messaging application that a user may use on the device in order to read his or her messages. In some use models, a user (e.g., user 130) can review his or her messages and can then use the inserted search box in order to initiate a search activity 180. In some use models, a user (e.g., user 130) can perform a search activity 180 and reply with a reply message 135 after a reply activity 190, possibly using the results of the search activity.

Figure 2:
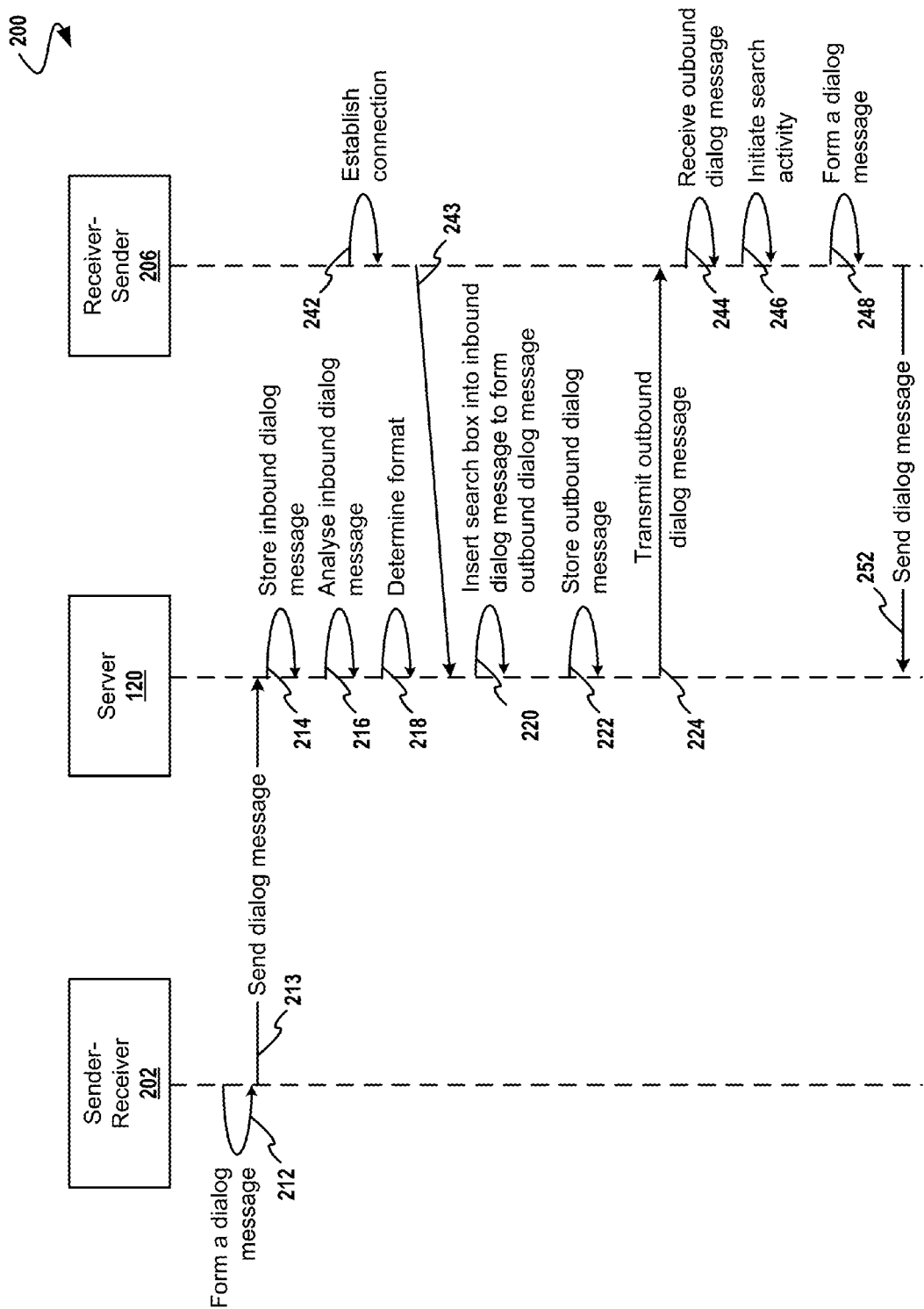
FIG. 2 is a ladder diagram of a protocol for inserting a search box into a mobile terminal messaging dialog, according to some embodiments.

FIG. 2 is a ladder diagram of a protocol 200 for inserting a search box into a mobile terminal messaging dialog. As an option, the present protocol 200 may be implemented in the context of the architecture and functionality of the embodiments described herein. Of course, however, the protocol 200 or any operation therein may be carried out in any desired environment.

As shown, the protocol serves to carry out a method to insert a search box into a dialog message when communicating a message between one user device (e.g., a sender-receiver 202) and another user device (e.g., a receiver-sender 206). In the portion of the protocol exchange shown, a sender-receiver 202 (e.g., a mobile user device) forms a dialog message (see operation 212) and sends the dialog message (see message 213) to a server 120. The server 120 in turn executes program code for receiving the dialog message from the sender-receiver 202. The dialog message may comprising a plurality of portions of content, including a written dialog message 110, and any other formatting and/or content as may be applicable to the specific format of the internet protocol used. Upon receipt, the server 120 stores the inbound instance of the dialog message from the sender-receiver (see operation 214), at least to analyze the inbound dialog message to determine the format of the inbound dialog message (see operation 216 and operation 218). For example, the inbound dialog message might be in an IMAP format, and/or it might be encoded using UNICODE, and/or it might have other characteristics or formats that can be determined by the server 120.

In some cases, such as in a POP situation where the email is to be stored until retrieved, the server 120 will store the inbound dialog message until such a retrieval request is received. Such a request can come from a receiver-sender 206 at any point in time once the receiver-sender 206 has established a connection (see operation 242). If there is a stored dialog message intended for the receiver-sender, then the server can respond by modifying the dialog message by inserting a search box into a selected portion of the dialog message to generate an outbound dialog message with the search box inserted using the search box format (see operation 220). It is also possible that the server communicates with a process (possibly on a different server) to determine any context-dependent or other relevancies (e.g., text to pre-populate the search box). In such a case, the outbound dialog message might again be stored, even if temporarily (see operation 222). Upon receiving a request from a second user for the dialog message (see message 243), the server begins transmitting the outbound dialog message with the inserted search box to the second user (see message 224). The receiver-sender 206 can review the contents of the received outbound message (see operation 244) and can use the inserted search box in order to initiate a search activity (see operation 246). Of course, the receiver-sender 206 can also take on the role of sender-receiver, and upon receiving the outbound dialog message (again, see operation 244), the receiver-sender 206 can form a dialog message to send to some recipient (see operation 248) and send a dialog message to the server 120 (see message 252).

Figure 3:
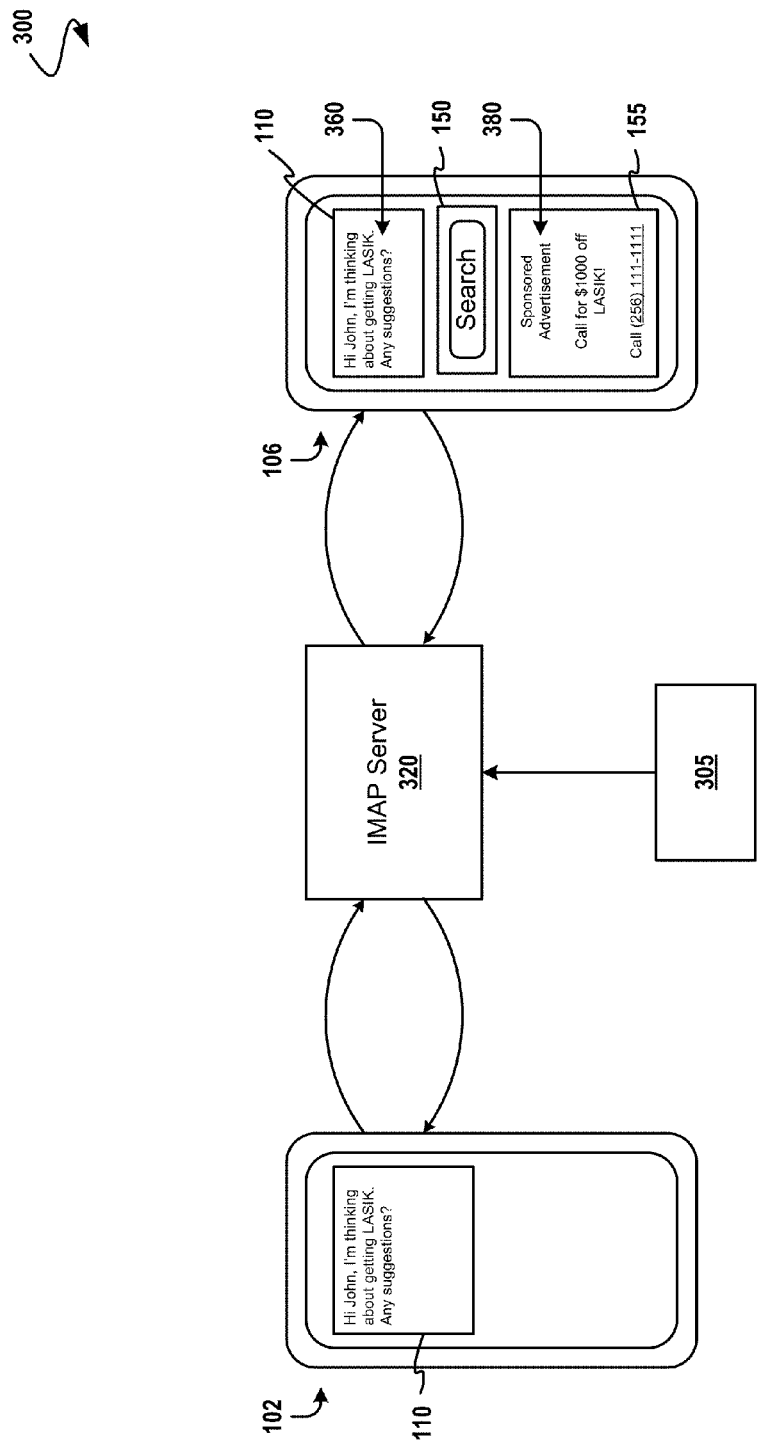
FIG. 3 is a diagram of a messaging dialog for inserting a search box into a mobile terminal messaging dialog, according to some embodiments.

FIG. 3 is a diagram of a messaging dialog 300 for inserting a search box into a mobile terminal messaging dialog. As an option, the present messaging dialog 300 may be implemented in the context of the architecture and functionality of the embodiments described herein. Of course, however, the messaging dialog 300 or any operation therein may be carried out in any desired environment.

As shown in FIG. 3, in addition to the insertion of a search box being inserted into a dialog message, other types of content such as news, images, video, etc. may also be inserted into the dialog message. More specifically, and as is seen in FIG. 3, the modified dialog message 170 may comprise a variable amount of dialog message text 360. In some embodiments, the dialog message text 360 may be written by another user (e.g., first user) and transmitted to a user by a server (e.g., an internet messaging protocol IMAP server 320). For example, the dialog message text 360 may comprise some portion or all portions of a dialog message (e.g., written dialog message 110) that had been previously transmitted to a server. A user may receive the modified dialog message 170 after receiving the dialog message from the server. The modified dialog message 170 may comprise the dialog message text 360 and an inserted search box 150. The inserted search box 150 might be presented in a top portion of the modified dialog message 170. Or, the inserted search box 150 might be presented in a lower portion of the modified dialog message 170, or in any juxtaposition for that matter.

In some embodiments, the inserted search box 150 may comprise a variable amount of inserted search box text 380. In the same or alternative embodiments, the inserted search box text 380 may comprise a search box that has been targeted to the user receiving the modified dialog message 170. The inserted search box may be targeted such that the inserted search box text 380 may correspond to the dialog message text 360. For example, the inserted search box 150 may be selected to be inserted into the modified dialog message 170 based on the subject matter of the dialog message text 360 and the subject matter of the inserted search box 150. As such, the inserted search box 150 and/or any content to be included with the inserted search box 150 may be selected based on the context of the dialog message text 360. Strictly as an example, the dialog message text 360 may comprise a message about 'LASIK' procedures. The inserted search box 150 may be selected based on keywords of the modified dialog message 170. In some embodiments, the inserted search box 150 may be selected for insertion into the modified dialog message 170 at least partly based on the geographical location of a user. If a user receiving the modified dialog message 170 is in a particular geographical area, then some portion or all portions of the inserted search box 150 may be selected based on the user's geographical area.

As such, the modified dialog message 170 may comprise a previously sent dialog message from another user with an inserted search box. In some embodiments, the inserted search box may be targeted (e.g., selected to be inserted into the previously sent dialog message) based on the context of the previously sent dialog message and/or a geographical location of the user receiving the dialog message. Or, in some embodiments, the inserted search box may be presented with or in proximity to a targeted advertisement 155 the contents of which targeted advertisement 155 may be based on the context of the previously sent dialog message and/or a geographical location of the user receiving the dialog message. Or, the inserted search box may include or be presented in proximity to a variable amount of inserted search box text 380, the variable amount of inserted search box text comprising targeted content. The targeting operations can be performed by a separate server 305.

Figure 4:
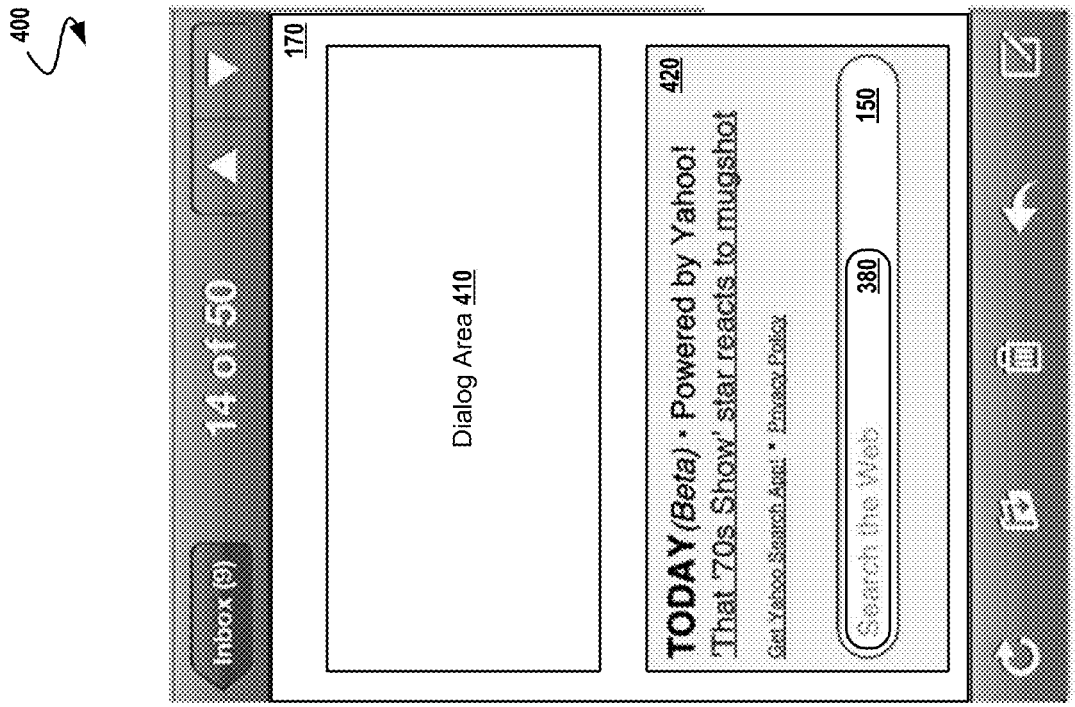
FIG. 4 is a graphic showing selected portions of a composition screen during a transformation for inserting a search box into a mobile terminal messaging dialog, according to some embodiments.
Figure 4:
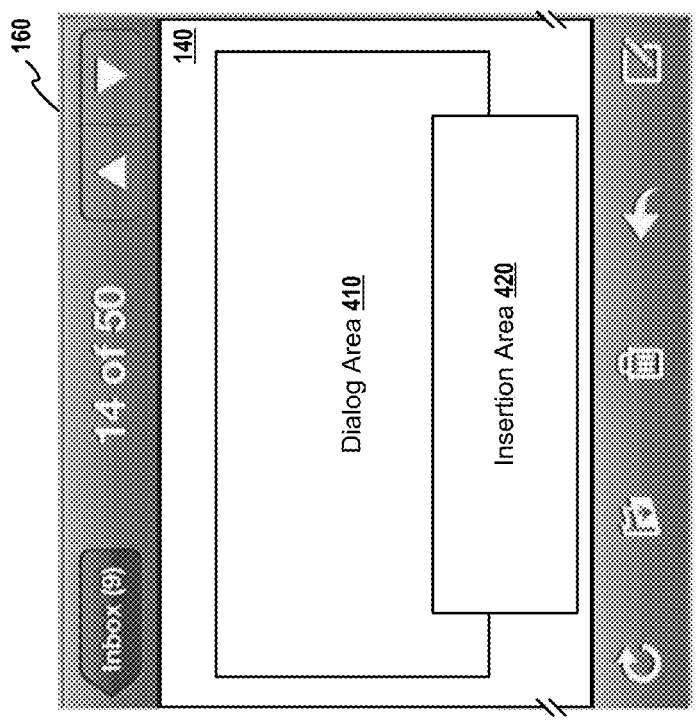

FIG. 4 is a graphic 400 showing selected portions of a composition screen during a transformation for inserting a search box into a mobile terminal messaging dialog. As an option, the present transformation 400 may be implemented in the context of the architecture and functionality of the embodiments described herein. Of course, however, the transformation 400 or any operation therein may be carried out in any desired environment.

The graphic of FIG. 4 shows a portion of a dialog message composition screen 160. Included in the dialog message composition screen is a dialog area 410. Such a dialog area 410 can contain a message or portion of a message to be read (e.g., by a user), possibly including a user's written dialog message 110, or portion thereof. The graphic of FIG. 4 also shows an exemplary instance of an insertion area 420. The insertion area serves to present a search box, possibly pre-populated with context-driven terms based on the user's message. And, in this or other cases, the search box may be presented with context-driven content given in the insertion area. In exemplary cases, the context-driven content given in the insertion area is based on terms present in the user's message (e.g., terms found within the dialog area).

The insertion area can be presented below the dialog area, or to the right of the dialog area, or can overlap the dialog area (as shown), or can be presented in any juxtaposition with respect to the dialog area. The aspect ratio can be portrait, or landscape, or any other aspect ratio. Moreover the size of the inserted search box can vary, depending on the characteristics of the user device, and depending on the characteristics of the dialog message composition screen 160.

Embodiments described herein can modify the dialog message by changing the size of any portion of the dialog message. In particular, some embodiments change the size of the dialog area 410 when generating a modified dialog message 170. The size of the inserted search box and any other content in the insertion area can be determined dynamically, and the content (e.g., relevant content) and/or any text provided in a pre-populated search box can be determined dynamically. More specifically, some embodiments include a variable amount of inserted search box text 380, and some embodiments can pre-populate the search box with text that is at least partly based on the dialog message. The aspect of the dialog message upon which is based the text to pre-populate the search box can be textual or can be graphical. For example, if a dialog message contains a particular emoticon (e.g., a happy face, a social network emoticon, etc.), a sentiment can be inferred, and a separate server 305 can perform targeting. In some cases the search box can be presented along with an advertisement (e.g., in the proximity of or within the bounds of insertion area 420). For example, and as shown, the modified dialog message 170 contains an exemplary instance of an insertion area 420 that contains an advertisement for, "That '70s Show".

In some embodiments, the dialog message is formatted to comport with an internet messaging protocol, and such a format may comprise HTML content. A server may scan and/or identify contents and sizes of the contents of the dialog message, and can perform HTML analysis and insertion of HTML to generate a modified dialog message 170. Table 1 shows a portion of the HTML source of the inserted search box.

TABLE 1

Portion of the HTML source of the inserted search box

| Line | Code |
|---|---|
| 1 | <XHTML-STRIPONREPLY> |
| 2 | <script>document.write(" |
| 3 | <img width=1 height=1 src="http://geo.yahoo.com/p?s=2146422618&t=258023651&syid=j4ijod060s&pkg=id-2220750>"); |
| 4 | </script> |
| 5 | <noscript> |
| 6 | <img width=1 height=1 src="http://geo.yahoo.com/p?s=2146422618&t=258023651&syid=j4ijod060s&pkg=id-2220750"> |
| 7 | </noscript> |
| 8 | <script type="text/javascript" src="http://d.yimg.com/mi/ywa.js"> |
| 9 | </script> |
| 10 | <script type="text/javascript"> var YWATracker = YWA.getTracker("10001615631662");YWATracker.submit( ); |

TABLE 1-continued

Portion of the HTML source of the inserted search box

| Line | Code |
|---|---|
| 11 | </script> |
| 12 | <noscript> |
| 13 | <div> |
| 14 | <img src="http://a.analytics.yahoo.com/p. pl?a=10001615631662&js=no" width="1" height="1" alt="" /> |
| 15 | </div> |
| 16 | </noscript> |
| 17 | <div style="margin:30px 0 20px;clear:both;-webkit-text-size-adjust:none;max-width:500px "> |
| 18 | <table style="width:100%;border:1px solid #CCC; background-color:#FFF-webkit-border-radius:5px;" cellspacing=2> |
| 19 | <tr> |
| 20 | <td style="background-color:#F0F0F0; padding:5px;"> |
| 21 | <b style="font-size:115%;margin:0 0 5px; color:#000;">TODAY |
| 22 | </b> |
| 23 | <i style="font-size:100%;margin:0;">(Beta) |
| 24 | </i> |
| 25 | <b style="color:#7B0099">• |
| 26 | </b> |
| 27 | <style="font-size:90%;margin:0;"> Powered by Yahoo! |
| 28 | <p style=" font-size:100%;color:#000;margin:0 0 5px;"> |
| 29 | <a href="http://l2.rd.sp2.yahoo.com/__ylc=X3oDMTFjZ2l1bHE4BF9TAzIxND Y0MjI2MTgEcGtnA2lkLTIyMjA3NTAEc3lpZANqNGlqb2QwNjBz/SIG=1317hj4nf /**http%3A//news.yahoo.com/blogs/sideshow/makeup-reddit-user-posts-startling-photo-212024218.html" style="color:#16387C ">Startling makeup photo sparks buzz |
| 30 | </a> |
| 31 | <br> |
| 32 | </p> |
| 33 | <p style="font-size:90%;margin:0;"> |
| 34 | <a href="http://search.yahoo.com/mobile/searchapp?p=yahoo__search__app&fr=appsrch&tsrc=appsrch" style="color:#16387C;font-size:70%">Get Yahoo Search App! |
| 35 | </a> |
| 36 | <b style=" color:#7B0099"> • |
| 37 | </b> |
| 38 | <a href="http://info.yahoo.com/privacy/us/yahoo/webbeacons/details.html" style="color:#16387C;font-size:70%" >Privacy Policy |
| 39 | </a> |
| 40 | <br> |

As shown in Table 1, the shown HTML can be inserted into a dialog message 140, and (as shown) the HTML includes scripts (e.g., see lines 2-4, 8-9, and 10-11) to be inserted into a dialog message 140. Various techniques for inserting HTML into a dialog message 140 are further described in FIG. 8 and discussion thereto.

Figure 5:
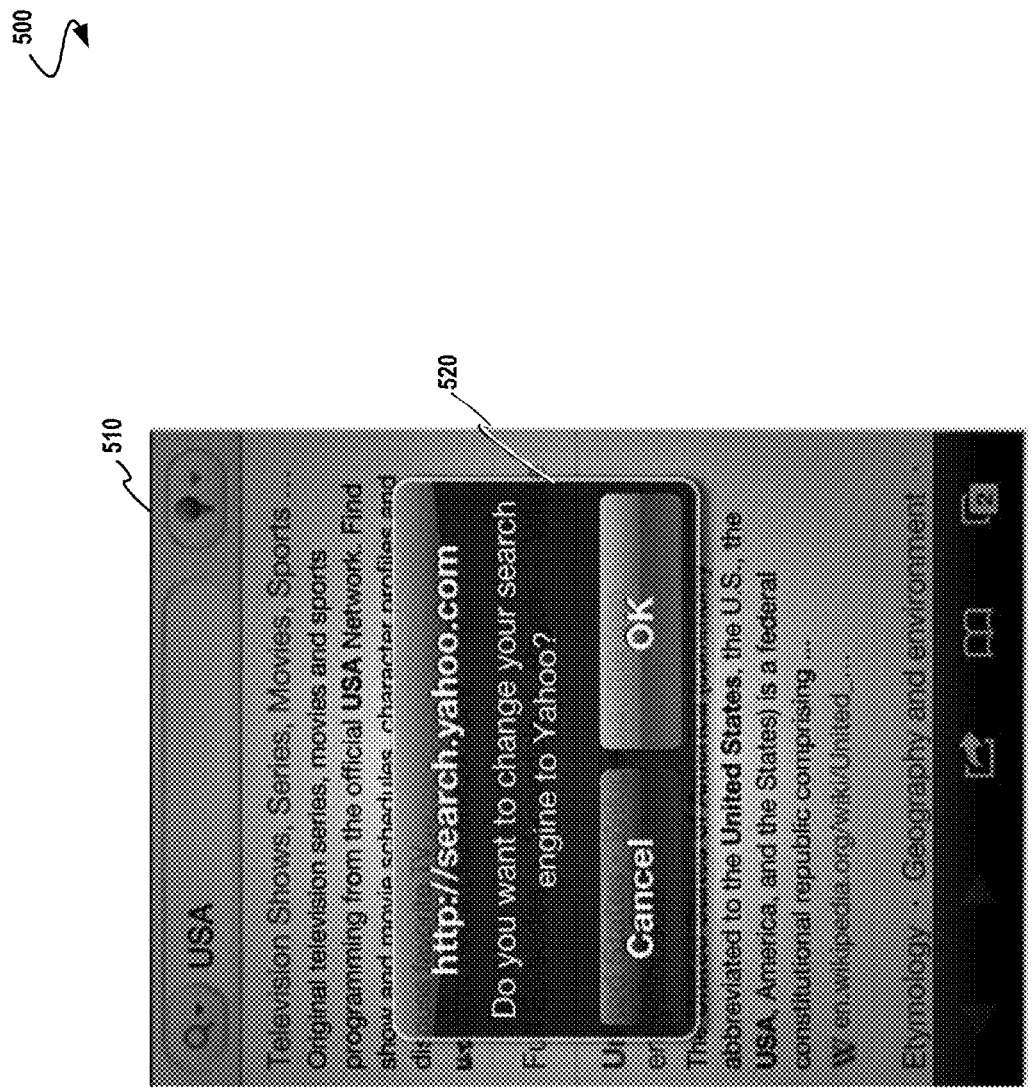
FIG. 5 is a graphic showing selected portions of a browser screen during a suggestion display in a system for inserting a search box into a mobile terminal messaging dialog, according to some embodiments.

FIG. 5 is a graphic 500 showing selected portions of a browser screen 510 during a suggestion display 520 in a system for inserting a search box into a mobile terminal messaging dialog. As an option, the present suggestion display may be implemented in the context of the architecture and functionality of the embodiments described herein. Of course, however, the suggestion display 520 or any operation therein may be carried out in any desired environment.

Given the capability to insert HTML, and/or to insert a script, it is possible to interact with the user via the text box. In some embodiments, when a user does decide to interact with the search box, embedded code (e.g., HTML or script) that was inserted with the text box might prompt the user to select a default search provider. Or, in some embodiments, when a user does decide to interact with the search box, embedded code (e.g., HTML or script) that was inserted with the text box launches a browser on the user device, which in turn might prompt the user to select a default search provider.

For example, HTML that was inserted with the text box might prompt the user to select a default search provider being Yahoo!, and the user might receive a suggestion display 520 in the form of an alert (see Table 2). In the example of FIG. 5, the user receives an alert to set a default search engine, the HTML code for which is partially reproduced in Table 2.

TABLE 2

Portion of the HTML source (showing default browser alert)

| Line | Code |
|---|---|
| 1 | <![if !IEMobile]> |
| 2 | <br> |
| 3 | <center> |
| 4 | <form method="get" action="http://search.yahoo.com/search" > |
| 5 | <input type="search" name="p" placeholder="Search the Web" style=" width:100%;font-size:90%; height:30px; margin:4px 0 2px;clear:both;-webkit-text-size-adjust:none;max-width:500px" /> |
| 6 | <input type="hidden" value="imapsrch" name="fr"> |
| 7 | <input type="hidden" value="imapsrch" name=".tsrc"> |
| 8 | </form> |
| 9 | </center> |
| 10 | <![endif]> |
| 11 | </p> |
| 12 | </td> |

TABLE 2-continued

Portion of the HTML source (showing default browser alert)

| Line | Code |
|---|---|
| 13 | </tr> |
| 14 | </table> |
| 15 | </div> |
| 16 | </XHTML-STRIPONREPLY> |

In addition to presenting the alert and soliciting user input, the HTML of Table 2 includes a check for the browser (see "<![if !IEMobile]>" in line 1 of Table 2). Using such a technique, multiple browsers are supported. Moreover, inasmuch as one browser differs from another browser, such differences can be known a priori, and the embedded code (e.g., HTML or script) can process differently to accommodate the browser differences.

Figure 6:
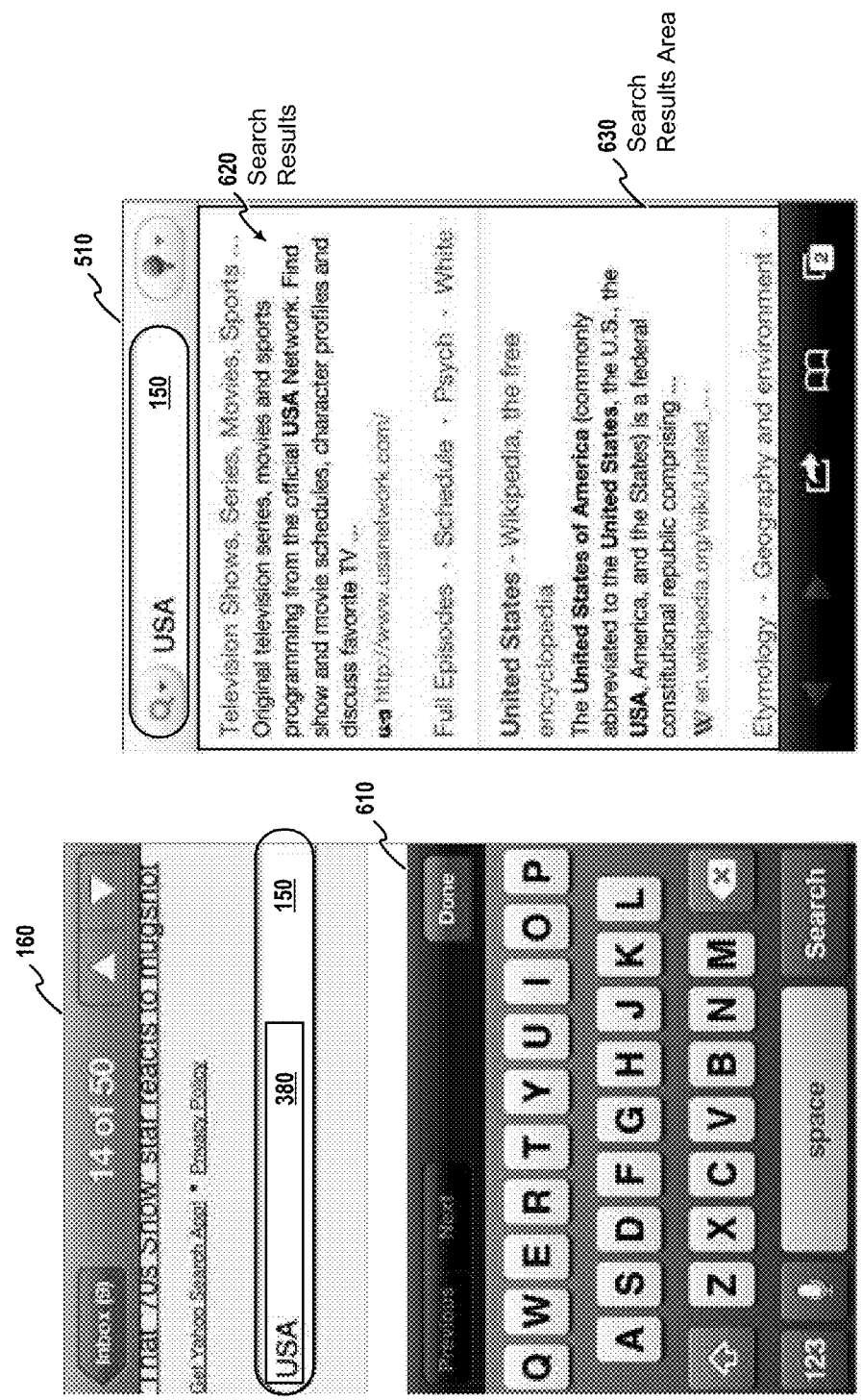
FIG. 6 is a graphic showing selected portions of a composition screen during a search activity while using a system for inserting a search box into a mobile terminal messaging dialog, according to some embodiments.

FIG. 6 is a graphic 600 showing selected portions of a composition screen during a search activity for inserting a search box into a mobile terminal messaging dialog. As an option, the present search activity may be implemented in the context of the architecture and functionality of the embodiments described herein. Of course, however, the search activity or any operation therein may be carried out in any desired environment.

As shown, the graphic depicts search activity that comprises activities where a user uses a keyboard 610 to enter (or confirm) a search query text into the search box (e.g., see search query text "USA" as shown). The user then completes the entry (e.g., by selecting the "Done" button). In this embodiment, the act of completing the entry launches a browser on the user's mobile device, and search results 620 are displayed in the search results area 630. As used herein, the launching of a browser on a mobile terminal comprises launching a mobile terminal browser where the mobile terminal browser is based on one of, Gecko or WebKit.

Figure 7:
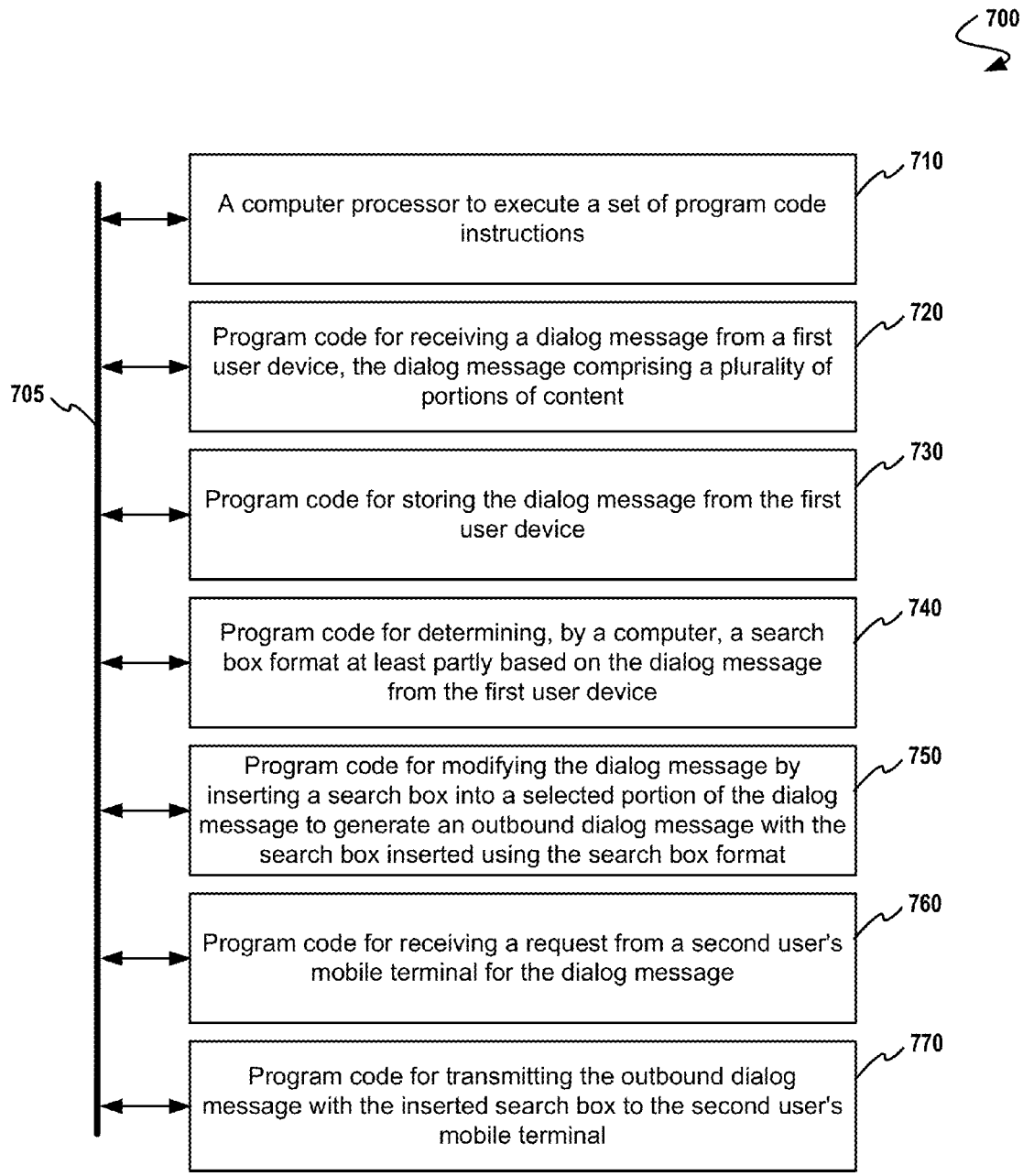
FIG. 7 depicts a block diagram of a system to perform certain functions of a computer system, according to some embodiments.

FIG. 7 depicts a block diagram 700 of a system to perform certain functions of a computer system. As an option, the present system 700 may be implemented in the context of the architecture and functionality of the embodiments described herein. Of course, however, the system 700 or any operation therein may be carried out in any desired environment.

As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving a dialog message from a first user device, the dialog message comprising a plurality of portions of content (see module 720); storing the dialog message from the first user device (see module 730); determining, by a computer, a search box format at least partly based on the dialog message from the first user device (see module 740); modifying the dialog message by inserting a search box into a selected portion of the dialog message to generate an outbound dialog message with the search box inserted using the search box format (see module 750); receiving a request from a second user's mobile terminal for the dialog message (see module 760); and transmitting the outbound dialog message with the inserted search box to the second user's mobile terminal (see module 770).

Figure 8:
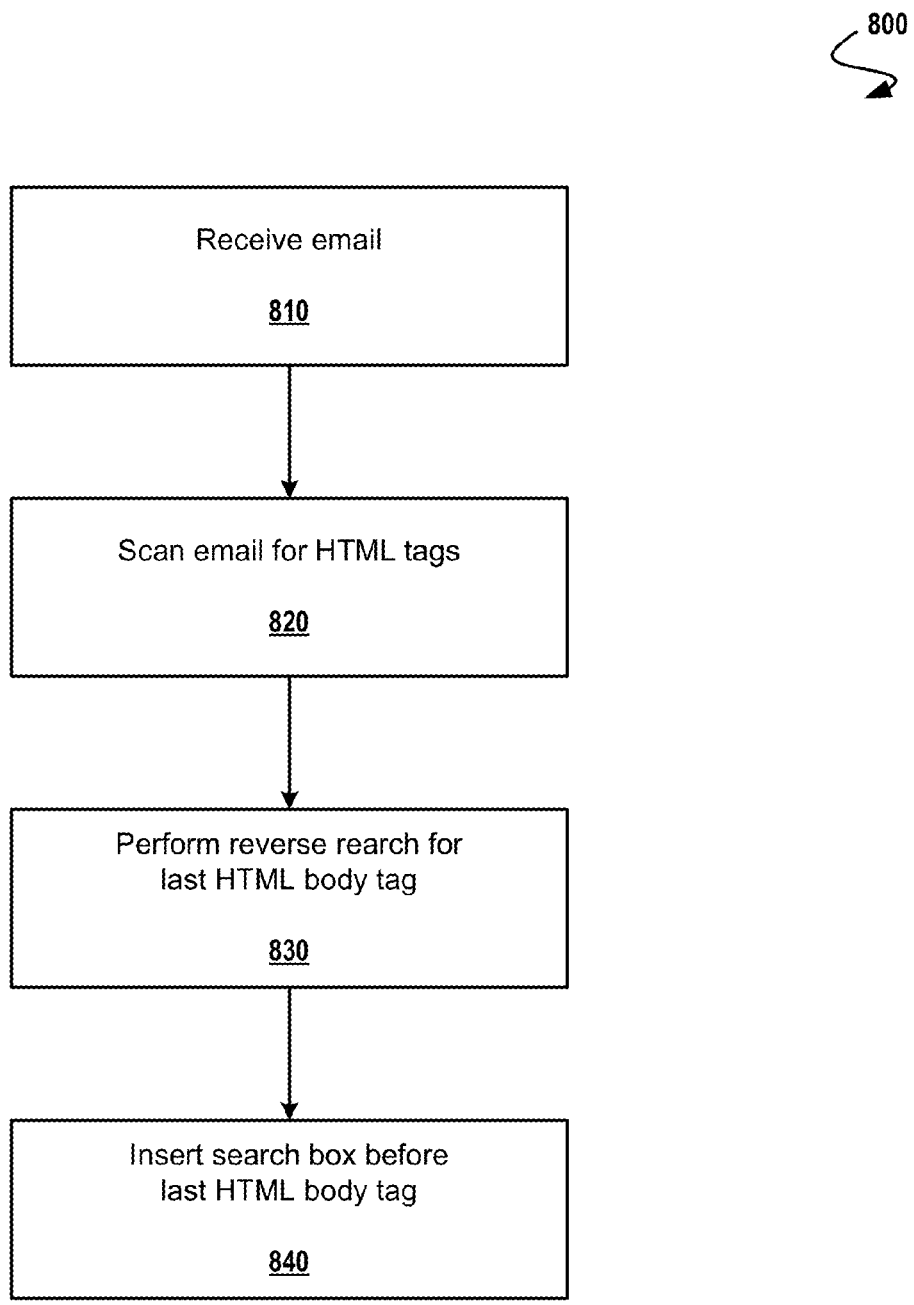
FIG. 8 is a flow chart representation of a process flow for inserting a search box into a mobile terminal messaging dialog, according to some embodiments.

FIG. 8 is a flow chart representation of a process flow 800 for inserting a search box into a mobile terminal messaging dialog. As an option, the present process flow 800 may be implemented in the context of the architecture and functionality of the embodiments described herein. Of course, however, the process flow 800 or any operation therein may be carried out in any desired environment.

As seen in FIG. 8, at block 810, a dialog message may be received. For example, a server (e.g., an internet messaging protocol server) may receive a dialog message transmitted by a first user to a second user. The server may store the received dialog message in an internet messaging protocol format. At block 820, portions of content of the dialog message may be identified. For example, the dialog message in an internet messaging protocol format may comprise a table of contents (TOC) that comprises an identification of one or more types of content and a size of the content. Or, for example, the stored dialog message in an internet messaging protocol format may comprise a first portion of HTML content of a size of 1 kilobyte (1024 bytes) and a second portion of text content of 240 bytes. As such, the internet messaging protocol server may scan and/or identify contents and sizes of the contents of the received dialog message in the internet messaging protocol format determined from the TOC of the dialog message. Other scans or analysis of the received dialog message may be performed (see block 820).

Depending on the size allocation of the contents and sizes of the contents of the received dialog message, a portion of the dialog message may be changed. For example, an internet messaging protocol server may place the inserted search box 150 into the HTML content of the dialog message. As such, an internet messaging protocol server may also change the identification of the size of the HTML content from the TOC of the dialog message to reflect the size of the inserted search box. For example, if the TOC identifies the HTML content portion to comprise (for example) 1 kilobyte and the search box to be inserted by an internet messaging protocol server is (for example) 2 kilobytes, then the identification of the size of the HTML content of the TOC may be changed and/or modified from 1 kilobyte to 2 kilobytes to account for the inserted search box 150.

In some embodiments, the request for the dialog message may be received from a second user (e.g., a user using a mobile device). For example, the second user may correspond to a smartphone that requests the TOC information of the dialog message stored on an internet messaging protocol server. The second user may transmit a request for an identification of the portions of content of the dialog message and the corresponding sizes of the portions of the content (e.g., a dialog area, an image area, etc.) of the dialog message currently stored on an internet messaging protocol server in an internet messaging protocol format. In response, an internet messaging protocol server may transmit the TOC of any dialog messages requested by the second user. In some embodiments, the second user may then transmit a request for at least a portion of the dialog message stored on an internet messaging protocol server. For example, the second user, after receiving and/or identifying the TOC of the dialog message stored on an internet messaging protocol server, may request a part, segment, and/or portion of at least one of the identified portions of the dialog message stored on an internet messaging protocol server as identified by the TOC of the dialog message. For example, the TOC may comprise an identification of a first portion of content of the dialog message stored on an internet messaging protocol server as being HTML with a size allocation of 3 kilobytes (e.g., 1 kilobyte corresponding to the HTML content of the dialog message as originally received by an internet messaging protocol server from the first user, and 2 kilobytes corresponding to the search box inserted by an internet messaging protocol server). In response to receiving such an identification of the contents and corresponding size allocations, the second user may request a portion of the content of the dialog message. For example, the second user may request to receive 240 bytes of the HTML content of the dialog message stored on an internet messaging protocol server. In response, an internet messaging protocol server may transmit the requested 240 bytes of the HTML content of the stored dialog message to the second user. In some embodiments, the second user may then request a further portion and/or the rest of the content from an internet messaging protocol server. In response, an internet messaging protocol server may transmit the remaining bytes (e.g., ~2.8 kilobytes) where the remaining portion comprises the inserted search box as inserted by an internet messaging protocol server. In some embodiments, if the second user requests a portion of the dialog message that includes some, but not all, of the inserted search box, then a white space buffer (e.g., empty space) may be transmitted to the second user instead of a partial portion of the inserted search box. For example, if the HTML content of the dialog message comprises 1 kilobyte of HTML content as originally sent by the first user and 2 kilobytes of the search box (e.g., an HTML search box) inserted by an internet messaging protocol server, and if the second user requests 1.5 kilobytes of the HTML content as identified by the TOC of the dialog message, then an internet messaging protocol server may transmit the 1 kilobyte corresponding to the content originally sent by the first user and 0.5 kilobytes of empty space or white space as a buffer. As such, in some embodiments, an internet messaging protocol server may not transmit a portion of the inserted search box and may only transmit the full inserted search box to the second user.

At block 820, the dialog message may be scanned for HTML content. For example, an internet messaging protocol server may scan the dialog message for HTML content. At block 830, a reverse search of the dialog message may be performed. For example, an internet messaging protocol server may perform a reverse search for a last or final HTML body tag in the HTML content of the dialog message. At block 840, a search box may be inserted into the HTML content of the dialog message. In some embodiments, the search box may be inserted immediately before the last or final HTML body tag of the dialog message. As such, the process flow 800 may be used in response to a request from a client device that does not request a TOC of a dialog message. For example, the process flow 800 may be implemented in a user's computer. In some embodiments, a user device may specify whether that user will request a TOC or will request an entire dialog message. For example, a user with a computer with a broadband connection may specify that the user will want the entire dialog message with the inserted search box stored on an internet messaging protocol server or that a user with a mobile device may specify to receive the TOC and a portion of the dialog message with the inserted search box stored on an internet messaging protocol server. As such, an internet messaging protocol server may receive a notification from a user specifying how the user may request dialog messages to be transmitted from an internet messaging protocol server to the user.

Section III: Exemplary Practice of Embodiments

Figure 9:
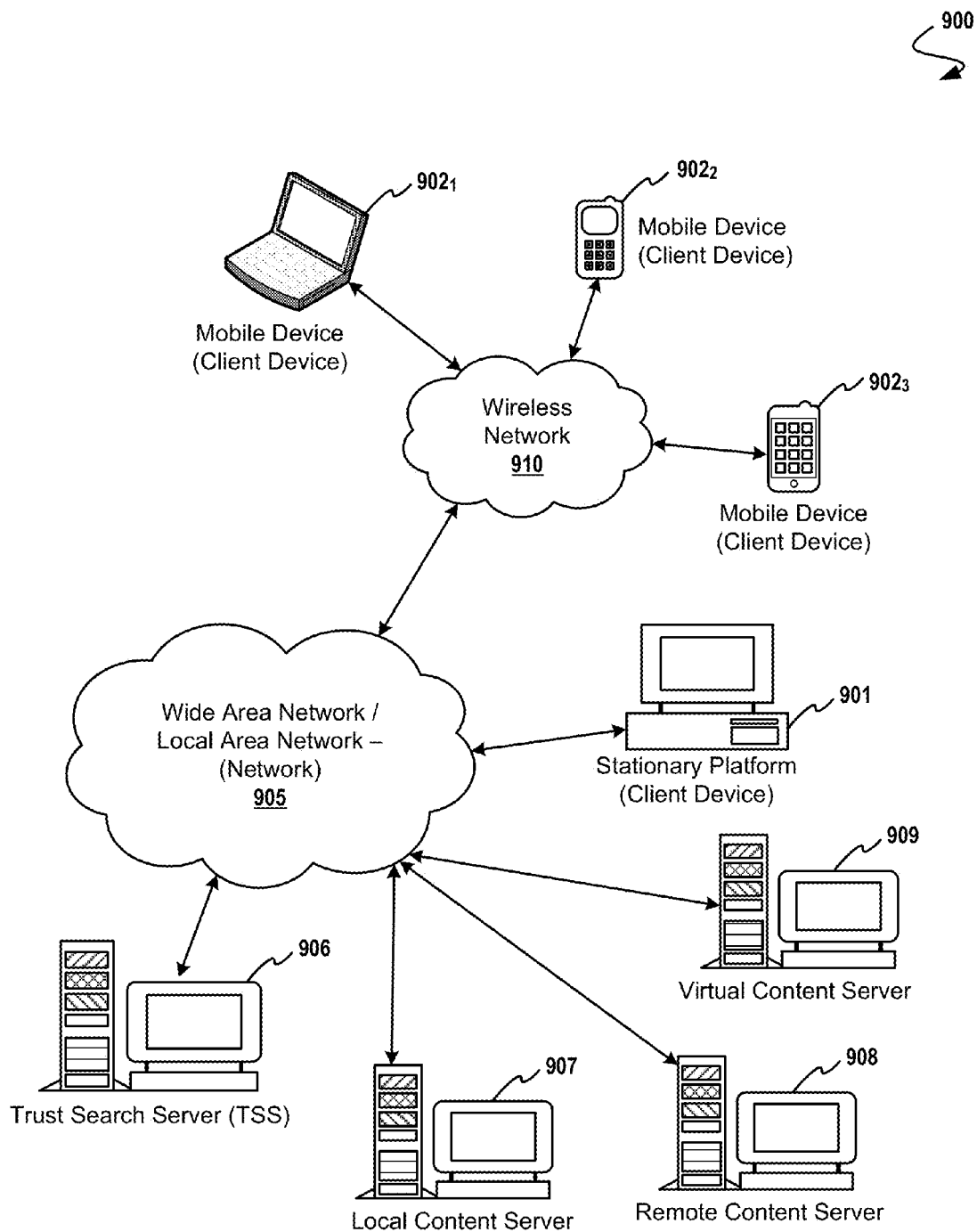
FIG. 9 is a schematic diagram illustrating an example embodiment of an advertising network, for implementing embodiments.

FIG. 9 is a schematic diagram 900 illustrating an example embodiment of an advertising network. Other embodiments that may vary, for example, in terms of arrangement or in terms of type of components, are also intended to be included within the claimed subject matter. As shown, FIG. 9 for example, includes a variety of networks such as a wide area network (WAN)/local area local area network (LAN) 905 and a wireless network 910; a variety of devices such as client devices (in the forms of a stationary platform 901, a first mobile device $902_1$, a second mobile device $902_2$, and another mobile device $902_3$); and a variety of servers such as local content server 907, a remote content server 908, a virtual content server 909, and such as a search server 906.

Figure 10:
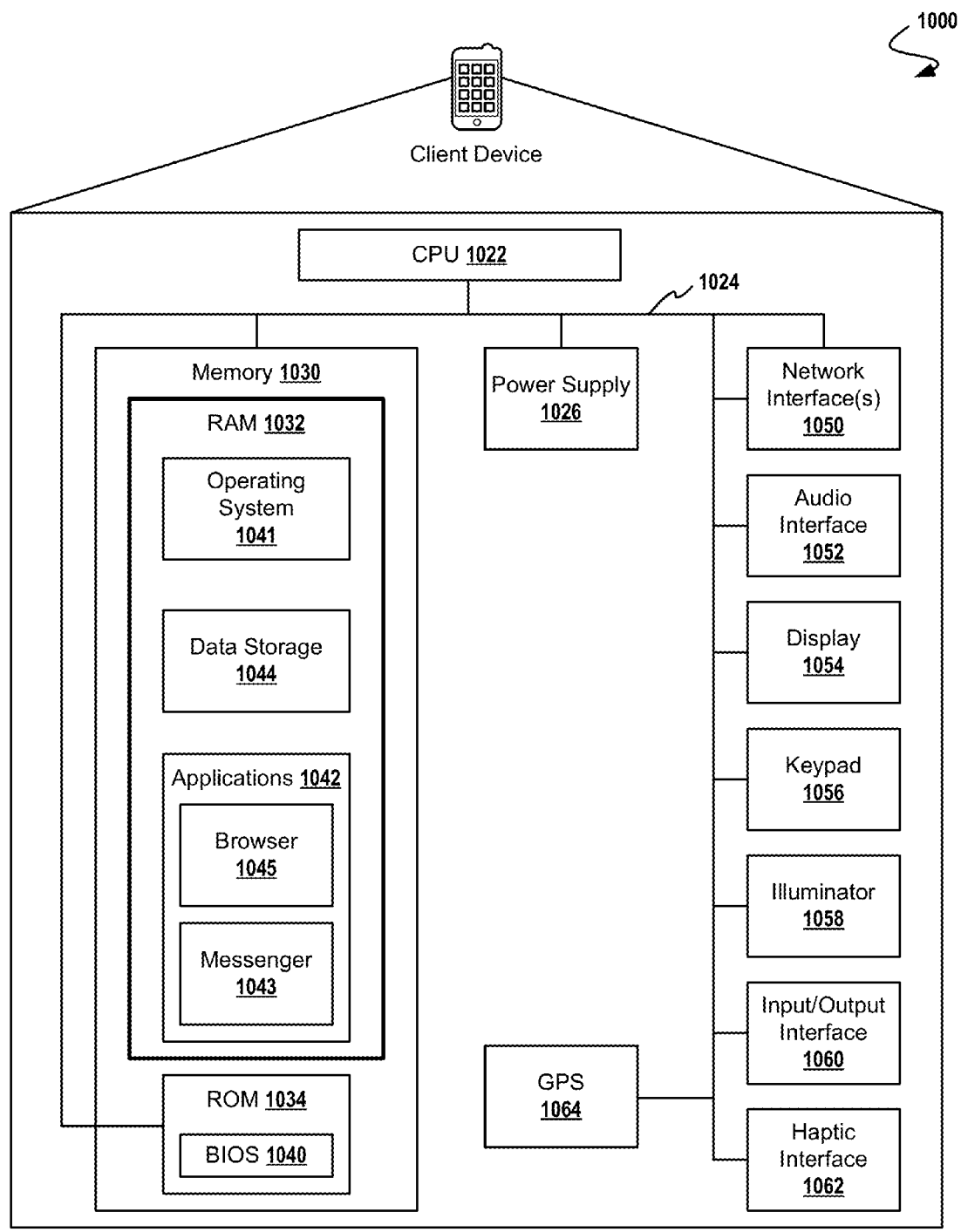
FIG. 10 is a schematic diagram illustrating an example embodiment of a client device for implementing embodiments.

FIG. 10 is a schematic diagram illustrating an example embodiment of a client device. A client device 1000 may include a computing device capable of sending or receiving signals such as via a wired or a wireless network. A client device may, for example, include a desktop computer or a portable device such as a cellular telephone, a smartphone, a display pager, a radio frequency (RF) device, an infrared (IR) device, a personal digital assistant (PDA), a handheld computer, a tablet computer, a laptop computer, a set top box, a wearable computer, an integrated device combining various features such as features of the forgoing devices, or the like.

A client device may vary in terms of capabilities or features. Claimed subject matter is intended to cover a wide range of potential variations. For example, a cell phone may include a numeric or other instance of a keypad 1056 or a display 1054 of limited functionality such as a monochrome liquid crystal display (LCD) for displaying text and symbols. In contrast, however, as another example, a web-enabled client device may include one or more physical or virtual keyboards, mass storage, one or more accelerometers, one or more gyroscopes, a global positioning system (e.g., GPS 1064), or other location-identifying type capability, or a display with a high degree of functionality such as a touch-sensitive color 2D or 3D display, possibly with backlighting or other illuminator 1058, or a haptic interface 1062, or another variety of input/output interface 1060, for example.

A client device may include memory 1030, possibly with a section of RAM 1032 or other memory (e.g., data storage 1044) or forms of non-volatile memory (e.g., ROM 1034) that can be accessed by a processor (e.g., a CPU 1022) and which may execute a variety of basic I/O functions (e.g., BIOS 1040) and/or may execute a variety of operating systems 1041, including a personal computer operating system such as a Windows, iOS or Linux, or a mobile operating system such as iOS, Android, or Windows Mobile, or the like. A client device may include or may execute a variety of possible applications 1042 such as a client software application enabling communication with other devices such as communicating one or more messages using a messenger application 1043, or such as via email, short message service (SMS), or multimedia message service (MMS), including via a network such as a social network, including, for example, Facebook, LinkedIn, Twitter, Flickr, or Google+, to provide only a few possible examples. A client device may also include or execute an application to communicate content such as, for example, textual content, multimedia content, or the like. A client device may also include or execute an application to perform a variety of possible tasks such as browsing using a browser 1045, searching, playing various forms of content, including locally stored or streamed video, audio (e.g., using audio interface 1052) or games (such as fantasy sports leagues), possibly including networked games or other applications using one or more instances of network interface 1050. Any of the foregoing functional blocks comprising the client device 1000 can be powered by one or more instances of a power supply 1026, and any of the foregoing functional blocks comprising the client device 1000 can communicate with any other of the foregoing functional blocks over a communication bus 1024. The foregoing is provided to illustrate that claimed subject matter is intended to include a wide range of possible features or capabilities.

Figure 11:
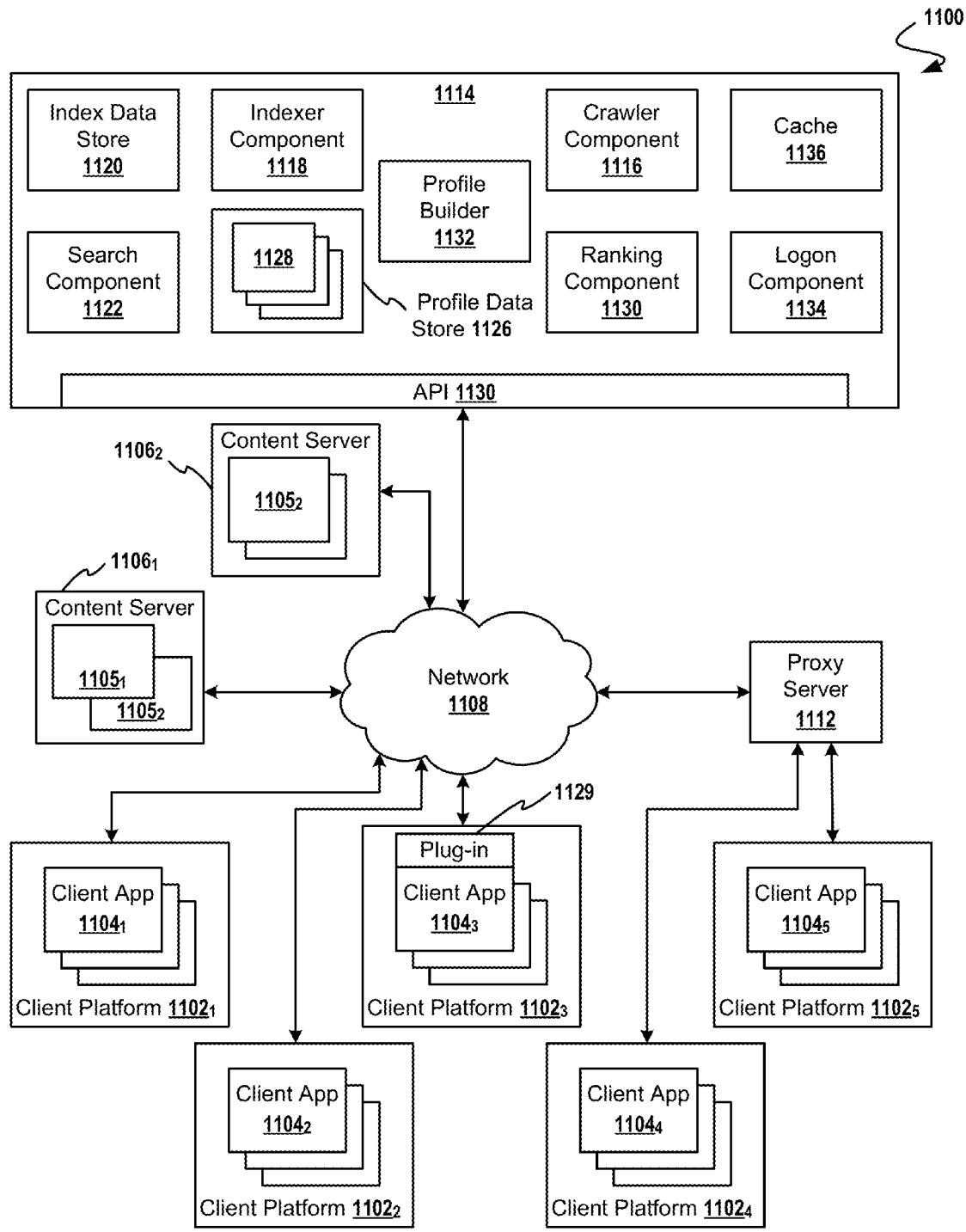
FIG. 11 is a schematic diagram illustrating an environment in which a search engine may operate.

FIG. 11 is a schematic diagram 1100 illustrating an environment in which a search engine 1114 may operate. A crawler component 1116 may be operable to communicate with a variety of content servers (e.g., content server $1106_1$, content server $1106_2$, etc.), and with client platforms (e.g., client platform $1102_1$, client platform $1102_2$, client platform $1102_3$, client platform $1102_4$, client platform $1102_5$, etc.) typically via network 1108. In some embodiments, a crawler starts with a list of URLs to visit. The list is called a seed list. As the crawler visits the URLs in the seed list, it identifies all the hyperlinks in the page(s) and adds them to a list of URLs to visit, called the crawl frontier. URLs from the crawler frontier are recursively visited according to a set of policies. A crawler typically retrieves files by generating a copy for storage such as local cache storage. A cache refers to a persistent storage device such as cache 1136. A crawler may likewise follow links, such as HTTP hyperlinks, in the retrieved file to additional files and may retrieve those files by generating a copy for storage, and so forth. A crawler may therefore retrieve files from a plurality of content servers as it "crawls" across a network.

An indexer component 1118 may be operable to generate an index of content, including associated contextual content such as for one or more databases, which may be searched (e.g., using a search component 1122) to locate content, including contextual content. An index may include index entries, where an index entry may be assigned a value referred to as a weight. An index entry may include a portion of the database or a portion of an index data store 1120. In some embodiments, an indexer may use an inverted index that stores a mapping from content to its locations in a database file, or in a document or a set of documents. A record level inverted index contains a list of references to documents for each word. A word level inverted index additionally contains the positions of each word within a document. A weight for an index entry may be assigned. For example, a weight, in one example embodiment, may be assigned substantially in accordance with a difference between the number of records indexed without the index entry and the number of records indexed within the index entry. In some cases, a logon component 1134 ensures authentication and authorization of a user to perform certain operations.

The term "Boolean search engine" refers to a search engine capable of parsing Boolean-style syntax such as may be used in a search query. A Boolean search engine may allow the use of Boolean operators (such as AND, OR, NOT, or XOR) to specify a logical relationship between search terms. For example, the search query "college OR university" may return results with "college," results with "university," or results with both, while the search query "college XOR university" may return results with "college" or results with "university," but not results with both.

In contrast to Boolean-style syntax, "semantic search" refers to a search technique in which search results are evaluated for relevance based at least in part on contextual meaning associated with query search terms. In contrast with Boolean-style syntax to specify a relationship between search terms, a semantic search may attempt to infer a meaning for terms of a natural language search query. Semantic search may therefore employ "semantics" (e.g., the science of meaning in language) to search repositories of various types of content.

Search results located during a search of an index performed in response to a search query submission may typically be ranked using a ranking component 1130. An index may include entries with an index entry assigned a value referred to as a weight. A search query may comprise search query terms, where a search query term may correspond to an index entry. In an embodiment, search results may be ranked by scoring located files or records, for example such as in accordance with the number of times a query term occurs weighed in accordance with a weight assigned to an index entry corresponding to the query term. Other aspects may also affect ranking such as, for example, the proximity of query terms within a located record or file, or semantic usage. A score and an identifier for a located record or file, for example, may be stored in a respective entry of a ranking list. A list of search results may be ranked in accordance with scores which may, for example, be provided in response to a search query. In some embodiments, machine-learned ranking (MLR) models are used to rank search results. MLR is a type of supervised or semi-supervised machine learning problem with the goal to automatically construct a ranking model from training data.

In one embodiment, as an individual interacts with a software application (e.g., client application $1104_1$, client application $1104_2$, client application $1104_3$, client application $1104_4$, client application $1104_5$, etc.) that may implement a plug-in 1129 or other add-on such as an instant messenger or an electronic mail application. Descriptive content (e.g., descriptive content $1105_1$, descriptive content $1105_2$, etc.) may be identified, and may take on various forms such as in the form of signals or stored physical states within memory (for example, an email address, instant messenger identifier, phone number, postal address, message content, date, time, etc.). Descriptive content may be stored, and is often stored along with contextual content. For example, how a phone number came to be identified (e.g., it was contained in a communication received from another communication via an instant messenger application) may be stored as contextual content associated with the phone number. Contextual content, therefore, may identify circumstances surrounding receipt of a phone number (e.g., the date or time the phone number was received) and may be associated with descriptive content. Contextual content may, for example, be used to subsequently search for associated descriptive content. For example, a search for phone numbers received from specific individuals, received via an instant messenger application or at a given date or time, may be initiated.

Content within a repository of media or multimedia, for example, may be annotated. Examples of content may include text, images, audio, video, or the like, which may be processed in the form of physical signals such as electrical signals, for example, or may be stored in memory as physical states, for example. Content may be contained within an object such as a web object, web page, website, electronic document, or the like. An item in a collection of content may be referred to as an "item of content" or a "content item," and may be retrieved from a "web of objects" comprising objects made up of a variety of types of content. The term "annotation" as used herein refers to descriptive or contextual content related to a content item, for example, collected from an individual such as a user, and stored in association with the individual or the content item Annotations may include various fields of descriptive content such as a rating of a document, a list of keywords identifying topics of a document, etc.

A profile builder 1132 may initiate generation of a profile such as for users of an application, including a search engine, for example. A profile builder may initiate generation of a user profile for use, for example, by a user, as well as by an entity that may have provided the application. For example, a profile builder may enhance relevance determinations and thereby assist in indexing, searching, or ranking search results. Therefore, a search engine provider may employ a profile builder, for example to populate a profile data store 1126, with one or more profile data records 1128.

A variety of mechanisms may be implemented to generate a profile including, but not limited to, collecting or mining navigation history, stored documents, tags, or annotations to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results such as with respect to a particular user. A client may interface to a network 1108 via a proxy server 1112.

FIG. 12 is a block diagram 1200 of a computer system, for implementing embodiments. FIG. 12 depicts a system for inserting a search box into a mobile terminal messaging dialog, according to some embodiments. The computer system includes nodes for client computer systems 1202₁ through computer system 1202_N, nodes for server computer systems 1204₁ through 1204_N, and nodes for network infrastructure 1206₁ through 1206_N, any of which nodes may comprise a machine (e.g., computer 1250) within which a set of instructions for causing the machine to perform any one of the techniques discussed above may be executed. The embodiment shown is purely exemplary, and might be implemented in the context of one or more of the figures herein.

Any node of the network may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g., a client computer system, a server computer system) and/or may comprise one or more embedded computer systems (including a processor and memory), a massively parallel computer system, and/or a cloud computer system.

The computer system (e.g., computer 1250) includes a processor 1208 (e.g., a processor core, a microprocessor, a computing device, etc.), a main memory 1210 (e.g., computer memory), and a static memory 1212, which communicate with each other via a system bus 1214. The computer 1250 may further include a display unit (e.g., computer display 1216) that may comprise a touch screen, or a liquid crystal display (LCD), or a light emitting diode (LED) display, or a cathode ray tube (CRT). As shown, the computer system also includes a human input/output (I/O) device 1218 (e.g., a keyboard, an alphanumeric keypad, etc.), a pointing device 1220 (e.g., a mouse, a touch screen, etc.), a drive unit 1222 (e.g., a disk drive unit, a CD/DVD drive, a tangible computer readable removable media drive, an SSD storage device, etc.), a signal generation device 1228 (e.g., a speaker, an audio output, etc.), and a network interface device 1230 (e.g., an ethernet interface, a wired network interface, a wireless network interface, a propagated signal interface, etc.).

The drive unit 1222 includes a machine-readable medium 1224 on which is stored a set of instructions (i.e., software, firmware, middleware, etc.) 1226 embodying any one, or all, of the methodologies described above. The set of instructions 1226 is also shown to reside, completely or at least partially, within the main memory and/or within the processor 1208. The set of instructions 1226 may further be transmitted or received via the network interface device 1230 over the system bus 1214.

It is to be understood that embodiments of this disclosure may be used as, or to support, a set of instructions executed upon some form of processing core (such as the CPU of a computer) or otherwise implemented or realized upon or within a machine- or computer-readable medium. A machine-readable medium includes any mechanism for storing non-transitory information in a form readable by a machine (e.g., a computer). For example, a machine-readable medium includes read-only memory (ROM); random access memory (RAM); magnetic disk storage media; optical storage media; flash memory devices; and electrical, optical or acoustical or any other type of media suitable for storing non-transitory information.

While the figures and description have been described with reference to numerous specific details, one of ordinary skill in the art will recognize that the claimed embodiments can be differently embodied in other specific forms without departing from the scope of the claims.

I claim:

1. A method comprising:
   receiving, by a processor, a dialog message from a first user device, the dialog message comprising a plurality of portions of content;
   storing, by the processor, the dialog message from the first user device;
   receiving, by the processor, a request from a second user's mobile terminal for the dialog message;
   determining, by the processor, a search box format at least partly based on the dialog message from the first user device;
   modifying, by the processor, the dialog message by inserting a search box into a selected portion of the dialog message to generate an outbound dialog message with the search box inserted within the dialog message using the search box format; and
   transmitting, by the processor, the outbound dialog message with the inserted search box to the second user's mobile terminal.

2. The method as set forth in claim 1, further comprising populating the search box with text at least partly based on the dialog message from the first user device.

3. The method as set forth in claim 1, further comprising storing the dialog message in at least one of, an Internet Message Access Protocol (IMAP) format, or a Short Message Service (SMS) format.

4. The method as set forth in claim 1, further comprising launching a mobile terminal browser.

5. The method of claim 1, wherein the search box comprises an advertisement.

6. The method of claim 1, wherein determining the search box format comprises analyzing a markup language.

7. The method of claim 1, wherein the modifying of the dialog message further comprises changing the size of the selected portion of the dialog message based on a size of the inserted search box.

8. A computer system comprising:
   a processor to execute a set of program code instructions; and
   a memory to store the program code instructions, in which the program code instructions comprises program code to perform:
   receiving, by the processor, a dialog message from a first user device, the dialog message comprising a plurality of portions of content;
   storing, by the processor, the dialog message from the first user device;
   receiving, by the processor, a request from a second user's mobile terminal for the dialog message;
   determining, by the processor, a search box format at least partly based on the dialog message from the first user device;
   modifying, by the processor, the dialog message by inserting a search box into a selected portion of the dialog message to generate an outbound dialog message with the search box inserted within the dialog message using the search box format; and
   transmitting, by the processor, the outbound dialog message with the inserted search box to the second user's mobile terminal.

9. The computer system as set forth in claim 8, further comprising populating the search box with text at least partly based on the dialog message from the first user device.

10. The computer system as set forth in claim 8, further comprising storing the dialog message in at least one of, an Internet Message Access Protocol (IMAP) format, or a Short Message Service (SMS) format.

11. The computer system as set forth in claim 8, further comprising launching a mobile terminal browser.

12. The computer system as set forth in claim 8, wherein the search box comprises an advertisement.

13. The computer system as set forth in claim 8, wherein determining the search box format comprises analyzing a markup language.

14. The computer system as set forth in claim 8, wherein the modifying of the dialog message further comprises changing the size of the selected portion of the dialog message based on a size of the inserted search box.

15. A non-transitory computer readable storage medium, the computer readable storage medium having stored thereon a sequence of instructions which, when executed by a processor, causes the processor to execute a method to implement inserting a search box into a mobile terminal messaging dialog, the method comprising:
   receiving, by the processor, a dialog message from a first user device, the dialog message comprising a plurality of portions of content;
   storing, by the processor, the dialog message from the first user device;
   receiving, by the processor, a request from a second user's mobile terminal for the dialog message;
   determining, by the processor, a search box format at least partly based on the dialog message from the first user device;
   modifying, by the processor, the dialog message by inserting a search box into a selected portion of the dialog message to generate an outbound dialog message with the search box inserted within the dialog message using the search box format; and
   transmitting, by the processor, the outbound dialog message with the inserted search box to the second user's mobile terminal.

16. The non-transitory computer readable storage medium as set forth in claim 15, further comprising populating the search box with text at least partly based on the dialog message from the first user device.

17. The non-transitory computer readable storage medium as set forth in claim 15, further comprising storing the dialog message in at least one of, an Internet Message Access Protocol (IMAP) format, or a Short Message Service (SMS) format.

18. The non-transitory computer readable storage medium as set forth in claim 15, further comprising launching a mobile terminal browser.

19. The non-transitory computer readable storage medium as set forth in claim 15, wherein the search box comprises an advertisement.

20. The non-transitory computer readable storage medium as set forth in claim 15, wherein determining the search box format comprises analyzing a markup language.

* * * * *